(12) United States Patent
Van Der Heyden

(10) Patent No.: US 11,773,023 B2
(45) Date of Patent: Oct. 3, 2023

(54) METHODS FOR PRODUCING AIR-CURED FIBER CEMENT PRODUCTS

(71) Applicant: ETEX SERVICES NV, Kapelle-op-den-Bos (BE)

(72) Inventor: Luc Van Der Heyden, Boortmeerkeck (BE)

(73) Assignee: Etex Services NV, Kapelle-op-den-Bos (BE)

( * ) Notice: Subject to any disclaimer, the term of this patent is extended or adjusted under 35 U.S.C. 154(b) by 1224 days.

(21) Appl. No.: 16/337,487

(22) PCT Filed: Oct. 5, 2017

(86) PCT No.: PCT/EP2017/075342
§ 371 (c)(1),
(2) Date: Mar. 28, 2019

(87) PCT Pub. No.: WO2018/065517
PCT Pub. Date: Apr. 12, 2018

(65) Prior Publication Data
US 2019/0345064 A1    Nov. 14, 2019

(30) Foreign Application Priority Data
Oct. 6, 2016 (EP) ..................... 16192660

(51) Int. Cl.
| C04B 28/04 | (2006.01) |
| B28B 3/00 | (2006.01) |
| C04B 14/28 | (2006.01) |
| C04B 16/06 | (2006.01) |
| C04B 18/14 | (2006.01) |
| C04B 18/165 | (2023.01) |
| C04B 18/26 | (2006.01) |
| C04B 40/00 | (2006.01) |

(52) U.S. Cl.
CPC ............ *C04B 28/04* (2013.01); *B28B 3/00* (2013.01); *C04B 14/28* (2013.01); *C04B 16/0641* (2013.01); *C04B 18/146* (2013.01); *C04B 18/165* (2013.01); *C04B 18/26* (2013.01); *C04B 40/0042* (2013.01); *C04B 40/0071* (2013.01)

(58) Field of Classification Search
CPC ..... C04B 14/28; C04B 16/0641; C04B 18/16; C04B 18/167; C04B 18/24; C04B 18/26; C04B 18/146; C04B 18/165; C04B 28/04; C04B 40/0042; C04B 40/0064; C04B 40/0071; B28B 3/00; Y02W 30/91
See application file for complete search history.

(56) References Cited

U.S. PATENT DOCUMENTS
| 4,406,703 A | 9/1983 | Guthrie et al. |
| 2008/0072796 A1 | 3/2008 | Utagaki et al. |
| 2019/0218143 A1 | 7/2019 | Van Der Heyden |

FOREIGN PATENT DOCUMENTS
| EP | 2952310 A1 | 12/2015 |
| EP | 3067177 A1 | 9/2016 |
| EP | 3305738 A1 | 4/2018 |
| EP | 3305742 A1 | 4/2018 |
| JP | 2003-063850 A | 3/2003 |
| JP | 2004-217482 A | 8/2004 |
| RU | 2476399 C1 | 2/2013 |
| SU | 990721 A1 | 1/1983 |
| SU | 1296541 A1 | 3/1987 |
| SU | 1726432 A1 | 4/1992 |
| WO | 2010/037628 A1 | 4/2010 |
| WO | 2012/084677 A1 | 6/2012 |
| WO | 2014/174093 A1 | 10/2014 |
| WO | 2016/142243 A1 | 9/2016 |
| WO | 2018/065520 A1 | 4/2018 |

OTHER PUBLICATIONS

Soydan et al "Air-Cured Fiber-Cement Composite Mixtures with Different Types of Cellulose Fibers", Advances in Materials Science and Engineering, vol. 2018, Article ID 3841514, 9 pages, https://doi.org/10.1155/2018/3841514. (Year: 2018).*

* cited by examiner

*Primary Examiner* — Anthony J Green
(74) *Attorney, Agent, or Firm* — Dilworth & Barrese, LLP

(57) ABSTRACT

The present invention relates to methods for the production of air-cured fiber cement products. More particularly, the present invention provides methods for the production of air-cured fiber cement products, at least comprising the steps of: (a) Providing cured fiber cement powder by comminuting cured fiber cement material; (b) Providing an aqueous fiber cement slurry comprising water, cementitious binder, natural or synthetic fibers and between about 5M % and about 40M % of said cured fiber cement powder; (c) Providing a green fiber cement sheet; and (d) Air-curing said green fiber cement sheet thereby providing an air-cured fiber cement product.

16 Claims, 18 Drawing Sheets

METHODS FOR PRODUCING AIR-CURED FIBER CEMENT PRODUCTS

FIELD OF THE INVENTION

The present invention relates to methods for the production of air-cured fiber cement products. More particularly, the present invention provides methods for the production of air-cured fiber cement products, at least comprising the steps of providing comminuted cured fiber cement material, being a powder, and forming an air-cured fiber cement product making use of the comminuted cured fiber cement material as one of the raw materials. The present invention further relates to air-cured fiber cement products obtained by these methods as well as to uses of these fiber cement products in the building industry.

BACKGROUND OF THE INVENTION

Fiber cement material is a composite material typically comprising cement, cellulose fibers, and at least one of silica sand, synthetic fibers and fillers. It is widely used in construction and can take the form of a plurality of products, such as for example corrugated sheets for roofs, small sheets for tiles (slates), sheets for sidings, cladding, boards, etc. Cured fiber cement waste material has a chemical composition similar to the corresponding fresh fiber cement products from which the waste is derived, and therefore could, and ideally should, be recycled and reused. Prior art patent documents US20080168927 and US20080072796 relate to methods for recycling fiber cement material waste.

However, recycling waste material from cured fiber cement products, e.g. finished products being out of spec, demolition and/or construction waste and alike, remains a major challenge. For example, from the known fiber cement waste recycling methods, it appears that it is very difficult to obtain a comminuted fiber cement material, i.e. fiber cement powder, starting from cured fiber cement material, which powder can subsequently be used as a raw material for fresh fiber cement products. In addition, up to now, the process features that are necessary for producing fresh air-cured fiber cement products from comminuted fiber cement waste material are not known. In fact, up to now, attempts to use ground waste material for the production of fresh air-cured fiber cement products, resulted in products not fulfilling the quality requirements as prescribed by national regulations.

More specifically, any attempt in the past to use comminuted fiber cement material as one of the raw materials for the production of fresh air-cured fiber cement products, resulted in an increased water absorption in the end products. This makes these products unusable for different reasons, such as an increased risk for molds, swelling and cracking.

Nevertheless, reusing fiber cement waste for various new purposes remains the main, if not the only, approach to avoid disposal of large fiber cement waste streams.

SUMMARY OF THE INVENTION

It is an object of the present invention to provide novel and improved methods for the production of fresh air-cured fiber cement products by using comminuted cured fiber cement waste material as one of the raw materials.

As described above, any attempts in the past to use comminuted fiber cement material as one of the raw materials for the production of fresh fiber cement products, resulted in an increased water absorption in the end products, making these products unusable for different reasons, such as an increased risk for molds, swelling and cracking.

The present inventors have solved this problem by developing an improved method for the production of fresh air-cured fiber cement products making use of comminuted fiber cement waste material. More specifically, it was found that the aqueous fiber cement slurry, which is to be used as a starting material for the production of the fresh air-cured fiber cement products, should comprise between about 5M % and about 40M % of cured comminuted fiber cement waste, which can be produced as further explained herein. In further particular embodiments, such fiber cement slurry comprises between about 5M % and about 30M % of cured comminuted fiber cement waste powder, such as between about 5M % and about 15M % of cured fiber cement powder. In yet further particular embodiments, the fiber cement slurry for the production of the fresh air-cured fiber cement products according to the methods of the present invention comprises less than about 15M % of cured fiber cement powder produced according to the methods of the invention, such as less than about 10M % of cured fiber cement powder, more preferably less than about 5M % of cured fiber cement powder. In respect of the above, the unit "M %" refers to the mass percentage of the component over the total dry mass of the composition, i.e. all components except free water.

In fact, the inventors have observed that when using less than about 40M % of fiber cement waste in the fiber cement slurry for the production of fresh fiber cement products, the water absorption of the fresh products can be reduced or at least kept the same, while the density can be reduced, when compared to fresh air-cured fiber cement products not containing any waste material.

Thus, with the methods of the present invention, the inventors have found a new way to process fiber cement waste in fresh air-cured products having a lower density compared to fresh fiber cement products not containing any waste and this without affecting the degree of water absorption. The property of decreased density remains an essential aspect with regard to improving the workability of fiber cement products in general.

In a first aspect, the present invention provides methods for the production of air-cured fiber cement products, at least comprising the steps of:
 (a) Providing cured fiber cement powder by comminuting cured fiber cement material;
 (b) Providing an aqueous fiber cement slurry comprising water, cementitious binder, natural or synthetic fibers and less than about 40M % of said cured fiber cement powder;
 (c) Providing a green fiber cement sheet; and
 (d) Air-curing said green fiber cement sheet thereby providing an air-cured fiber cement product.

In particular embodiments of the methods according to the invention, the step of providing an aqueous fiber cement slurry comprises mixing at least water, cementitious binder, natural or synthetic fibers and the cured fiber cement powder, such that the cured fiber cement powder is present in the aqueous fiber cement slurry in an amount of between about 5M % and about 35M % of the dry basis of said slurry. In further particular embodiments of the methods according to the invention, the step of providing an aqueous fiber cement slurry comprises mixing at least water, cementitious binder, natural or synthetic fibers and the cured fiber cement powder, such that the cured fiber cement powder is present in the aqueous fiber cement slurry in an amount of between about 5M % and about 25M % of the dry basis of said slurry. In yet further particular embodiments of the methods according to the invention, the step of providing an aqueous fiber cement slurry comprises mixing at least water, cementitious binder, natural or synthetic fibers and the cured fiber cement powder, such that the cured fiber cement powder is present in the aqueous fiber cement slurry in an amount of between about 5M % and about 15M % of the dry basis of said slurry.

In particular embodiments, the methods according to the invention further comprise the step of pressing the green fiber cement sheet prior to air-curing. In further particular embodiments, the step of pressing the green fiber cement sheet comprises compressing the green fiber cement sheet with a pressure of at between about 100 kg/cm$^2$ and 300 kg/m$^2$, such as between about 200 kg/cm$^2$ and 300 kg/cm$^2$, such as at about 230 kg/cm$^2$.

In particular embodiments of the methods according to the invention, the step of pressing the green fiber cement sheet comprises compressing the green fiber cement sheet during a time period of at least 300 seconds, such as at least 500 seconds, such as at least 600 seconds or at least 700 seconds. In further particular embodiments of the invention, the step of pressing the green fiber cement sheet comprises compressing the green fiber cement sheet during a time period of between about 300 seconds and about 700 seconds.

In particular embodiments of the methods according to the invention, the step of providing cured fiber cement powder comprises comminuting an air-cured fiber cement product. In further particular embodiments of the methods according to the invention, the step of providing cured fiber cement powder comprises comminuting an air-cured fiber cement product by using a pendulum mill.

In a second aspect, the present invention provides an air-cured fiber cement product obtained using the methods according to the present invention.

In a third aspect, the present invention provides the use of the air-cured fiber cements products as obtained by the methods of the invention, as a building material.

BRIEF DESCRIPTION OF THE DRAWINGS

FIG. 2 shows the particle size distribution curves of cement particles and of comminuted fiber cement powder as produced by the methods according to the present invention. Cement samples as well as air-cured fiber cement slate samples were each milled using a pendular mill type roller mill of the Poittemill Group (FR). The particle size distribution was then measured for both types of samples via laser beam diffraction in dry dispersion at 3 bar with a Malvern MasterSizer 2000.

FIG. 3 shows the particle size distribution curves of silica quartz particles and of comminuted fiber cement powder as produced by the methods according to the present invention. Silica quartz samples as well as air-cured fiber cement slate samples were each milled using a pendular mill type roller mill of the Poittemill Group (FR). The particle size distribution was then measured for both types of samples via laser beam diffraction in dry dispersion at 3 bar with a Malvern MasterSizer 2000.

FIG. 4 shows the particle size distribution curves of cement particles and of comminuted fiber cement powder as produced by the methods according to the present invention. Silica quartz samples as well as air-cured fiber cement slate samples were each milled using a pendular mill type roller mill of the Poittemill Group (FR). The particle size distribution was then measured for both types of samples via laser beam diffraction in dry dispersion at 3 bar with a Malvern MasterSizer 2000.

FIG. 5 is a picture showing the particle morphology of the comminuted fiber cement powder as obtained by the methods of the invention, which has a flowing behavior that is similar to the flowing behavior of cementitious powder, silica flour or limestone flour.

Figure 15:
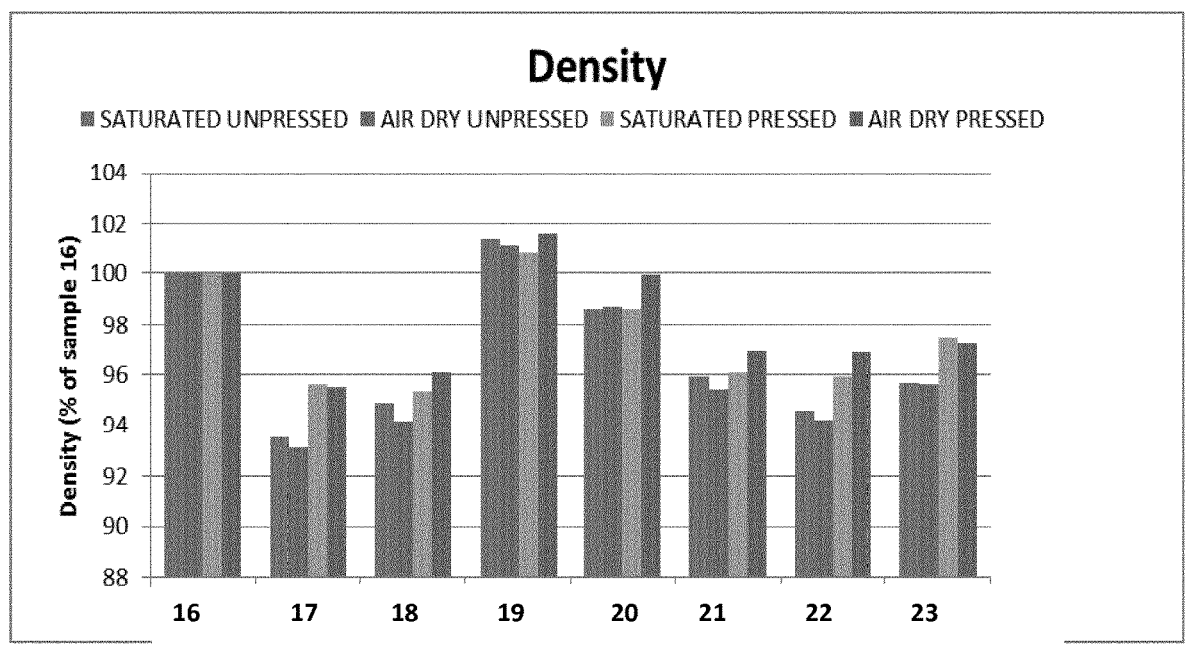

FIG. 15 represents the density (relative % of sample 16) of 6 different test samples (samples 17, 18, 20, 21, 22 and 23 of which the formulation is presented in Table 4) and two reference samples (samples 16 and 19 of which the formulation is presented in Table 4). The density was measured by saturating the samples during 72 hours in tap water. The weight of the samples was subsequently determined both under saturated and immersed conditions. Afterwards, the samples were placed to dry for 48 hours at about 105° C. For each of the dried samples, the weight was determined again. The density (X) for each sample was calculated by dividing the dry weight (C) by the difference between the immersed weight (B) and the saturated weight (A), according to the following formula: X=C/(A−B).

Figure 16:
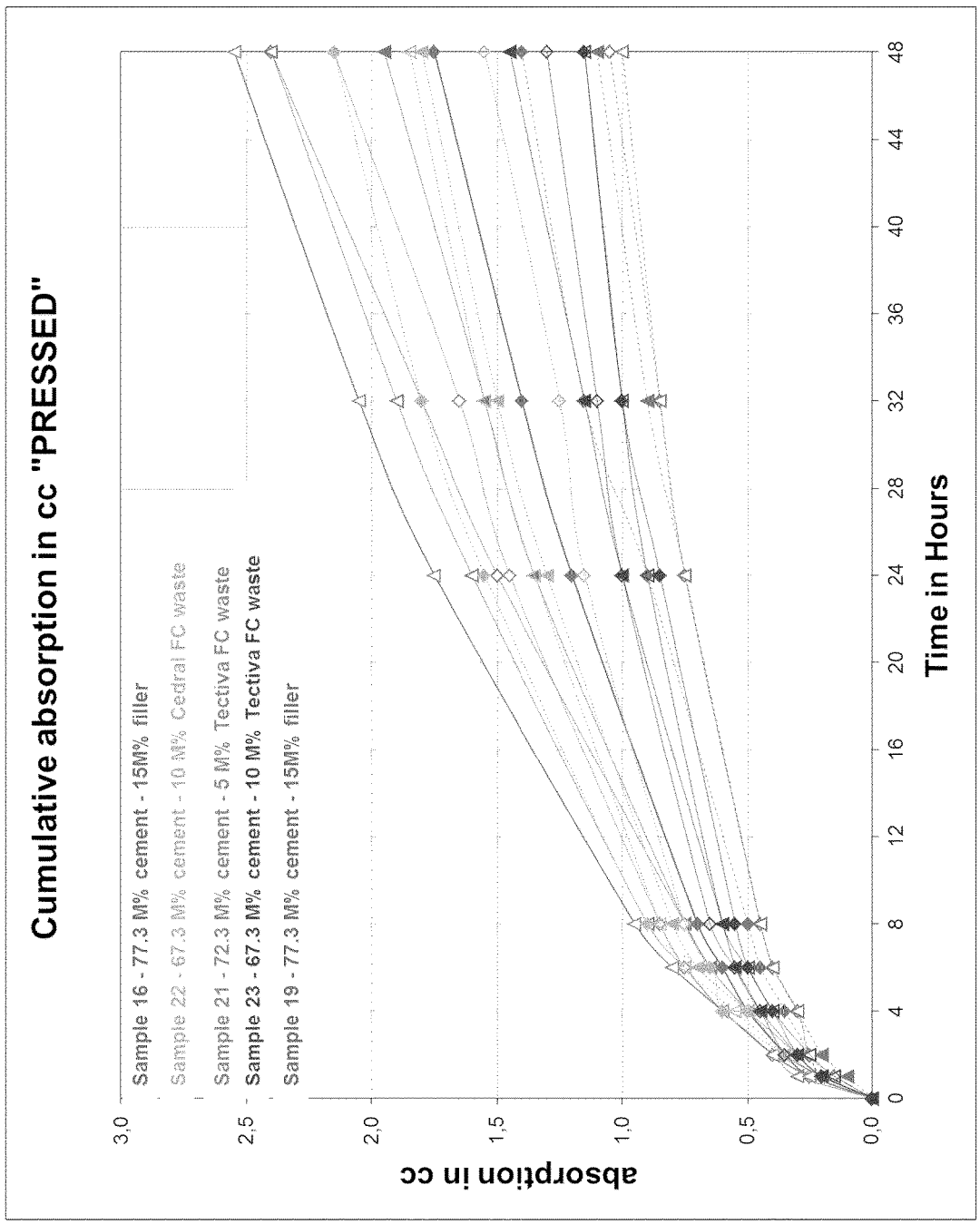

FIG. 16 shows the water absorption in function of time of 3 different test samples (samples 21, 22 and 23 of which the formulation is presented in Table 4) and two reference samples (samples 16 and 19 of which the formulation is presented in Table 4). The water absorption was measured using a Karsten test as further described herein.

Figure 17:
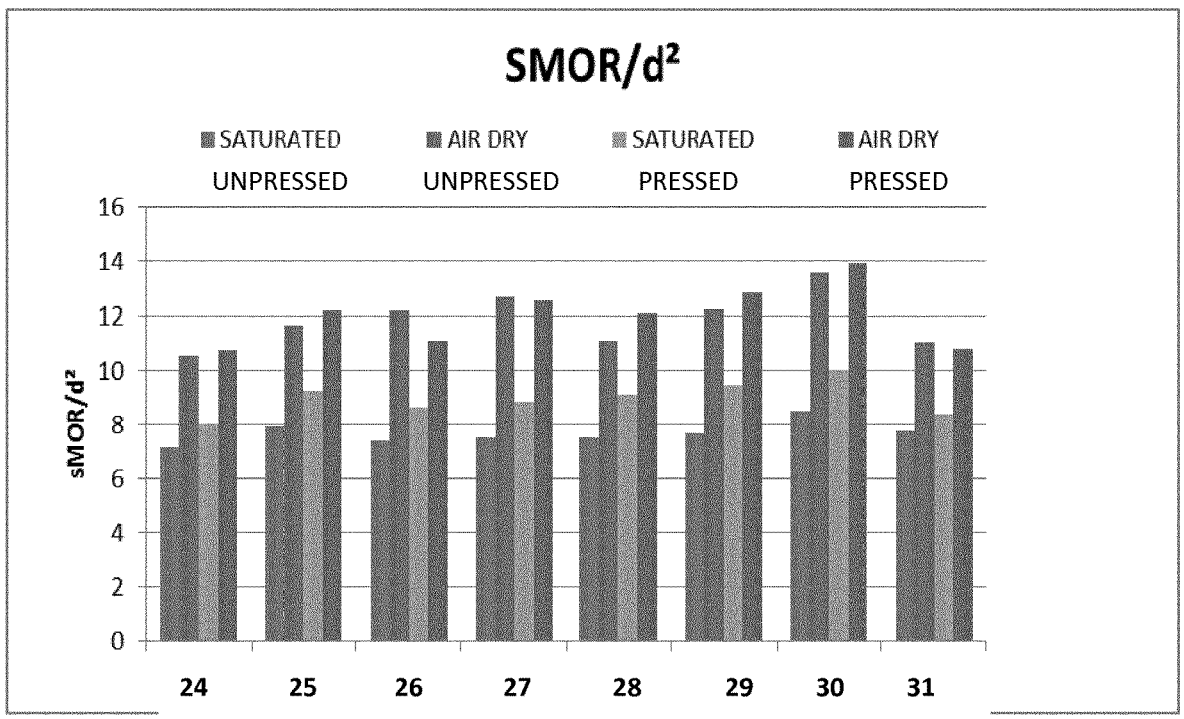

FIG. 17 represents the density normalized flexural strength (modulus of rupture; MOR) of 6 different test samples (samples 25, 26, 27, 28, 29 and 30 of which the formulation is presented in Table 5) and two reference samples (samples 24 and 31 of which the formulation is presented in Table 5). The modulus of rupture (MOR; expressed in Pa=kg/m·s$^2$) was measured by making use of a UTS/INSTRON apparatus (type 3345; cel=5000N).

Figure 18:
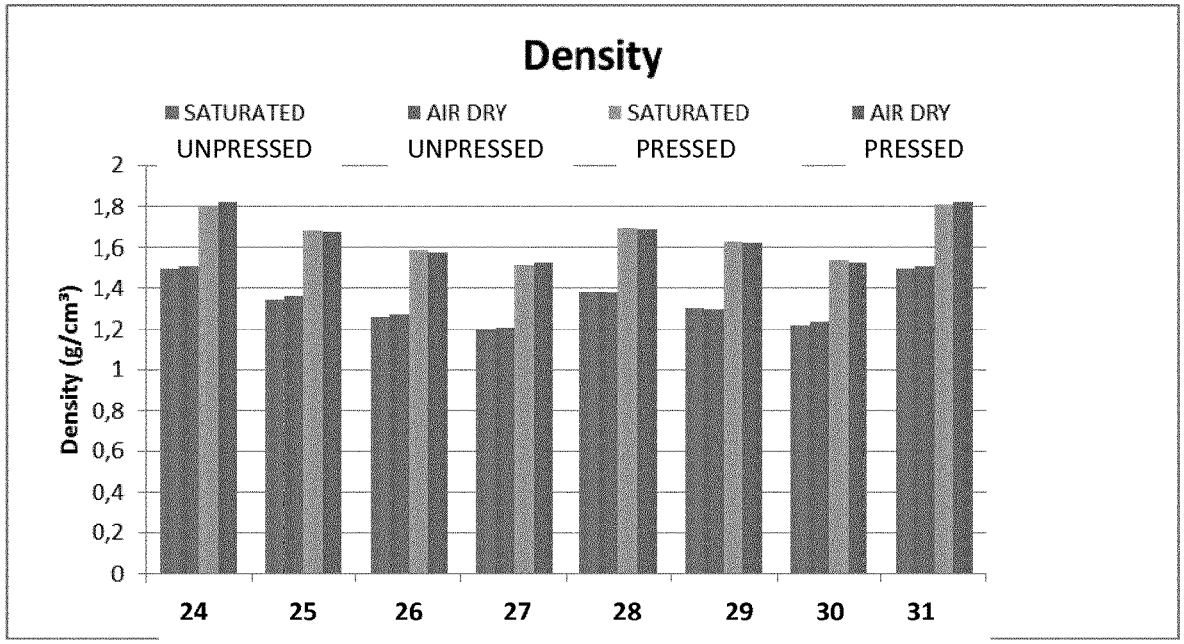

FIG. 18 represents the density of 6 different test samples (samples 25, 26, 27, 28, 29 and 30 of which the formulation is presented in Table 5) and two reference samples (samples 24 and 31 of which the formulation is presented in Table 5). The density was measured by saturating the samples during 72 hours in tap water. The weight of the samples was subsequently determined both under saturated and immersed conditions. Afterwards, the samples were placed to dry for 48 hours at about 105° C. For each of the dried samples, the weight was determined again. The density (X) for each sample was calculated by dividing the dry weight (C) by the difference between the immersed weight (B) and the saturated weight (A), according to the following formula: X=C/(A−B).

Figure 19:
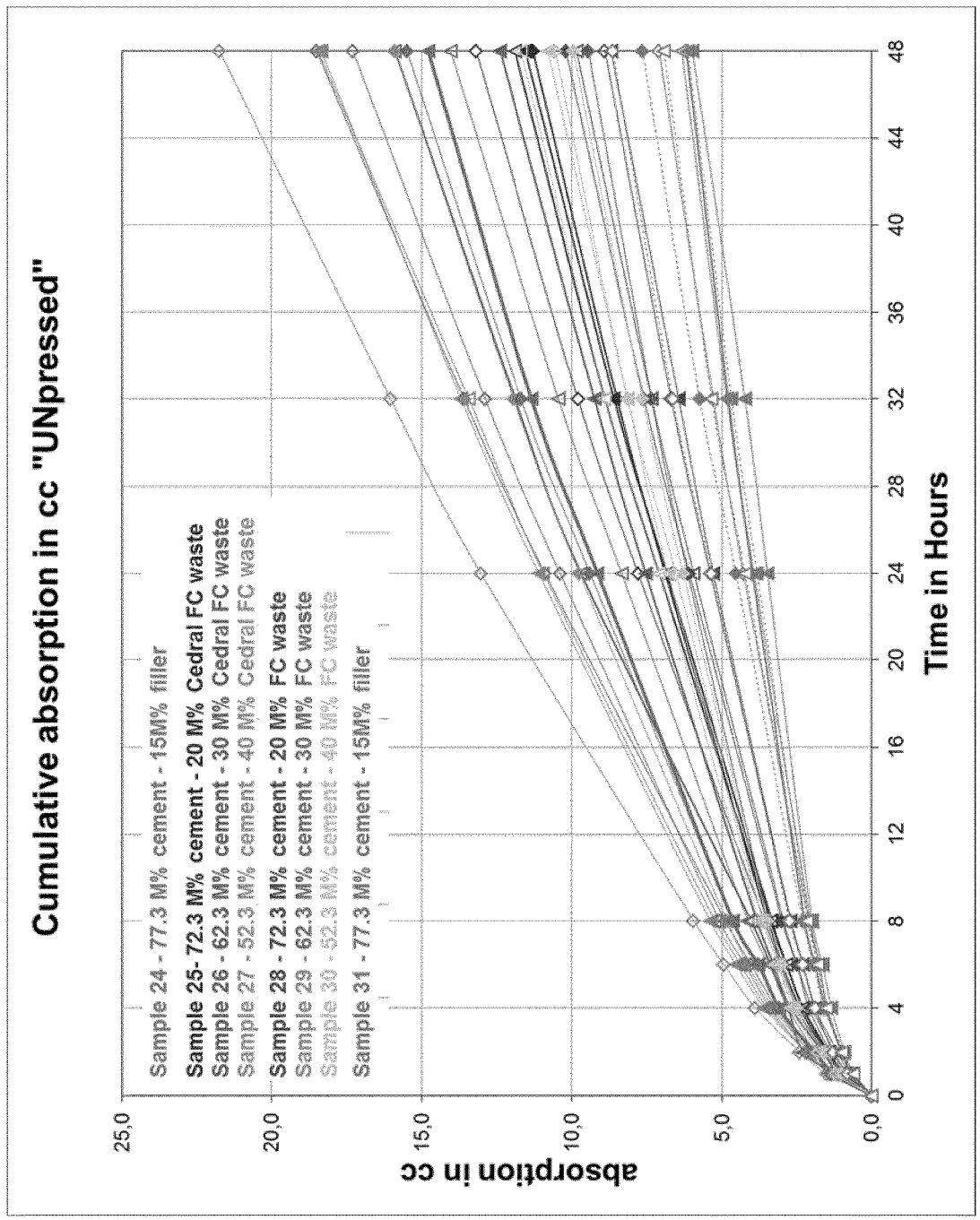

FIG. 19 shows the water absorption in function of time of 6 different test samples (samples 25, 26, 27, 28, 29 and 30 of which the formulation is presented in Table 5) and two reference samples (samples 24 and 31 of which the formulation is presented in Table 5), as measured before pressing. The water absorption was measured using a Karsten test as further described herein.

Figure 20:
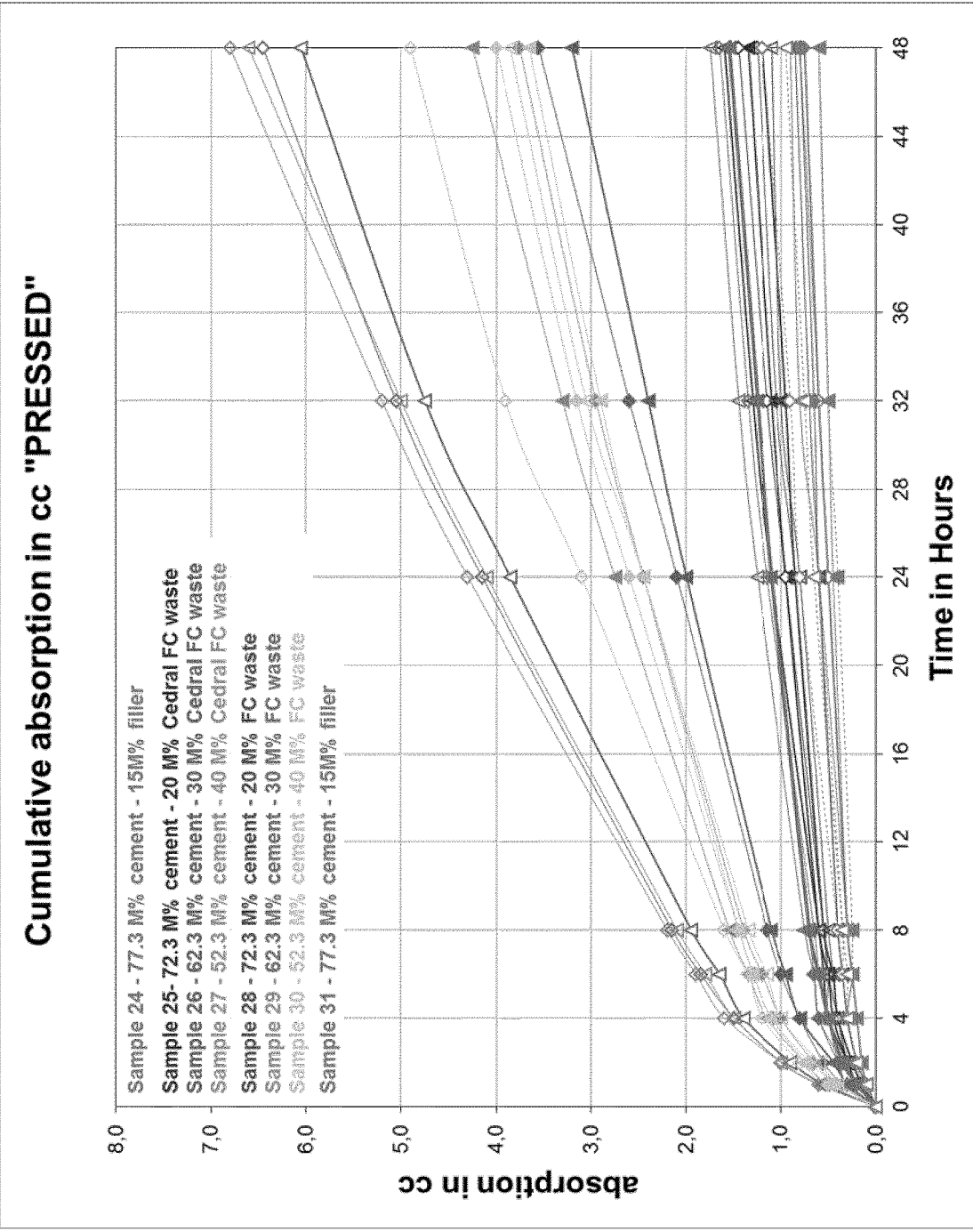

FIG. 20 shows the water absorption in function of time of 6 different test samples (samples 25, 26, 27, 28, 29 and 30 of which the formulation is presented in Table 5) and two reference samples (samples 24 and 31 of which the formulation is presented in Table 5), as measured after pressing. The water absorption was measured using a Karsten test as further described herein.

Figure 21:
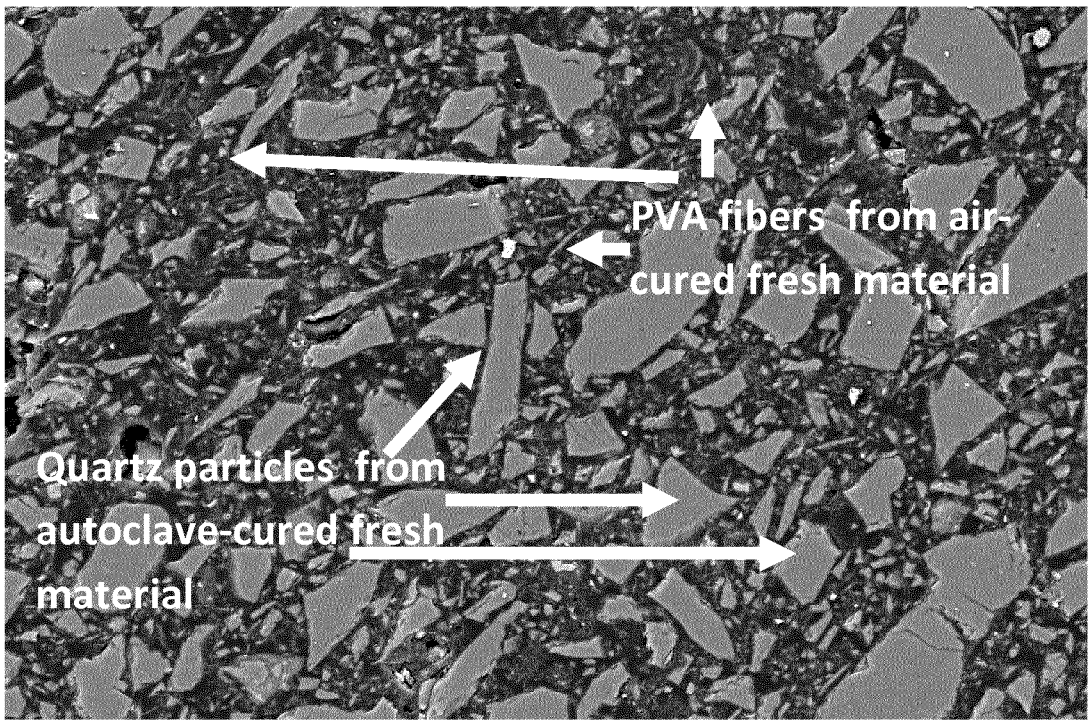

FIG. 21 is a SEM (scan electron microscopy) picture of a sample of air-cured fiber cement product, which comprises recycled autoclave-cured fiber cement waste (characterized by the clearly visible white quartz particles in the product) manufactured according to the methods of the present invention.

Figure 22:
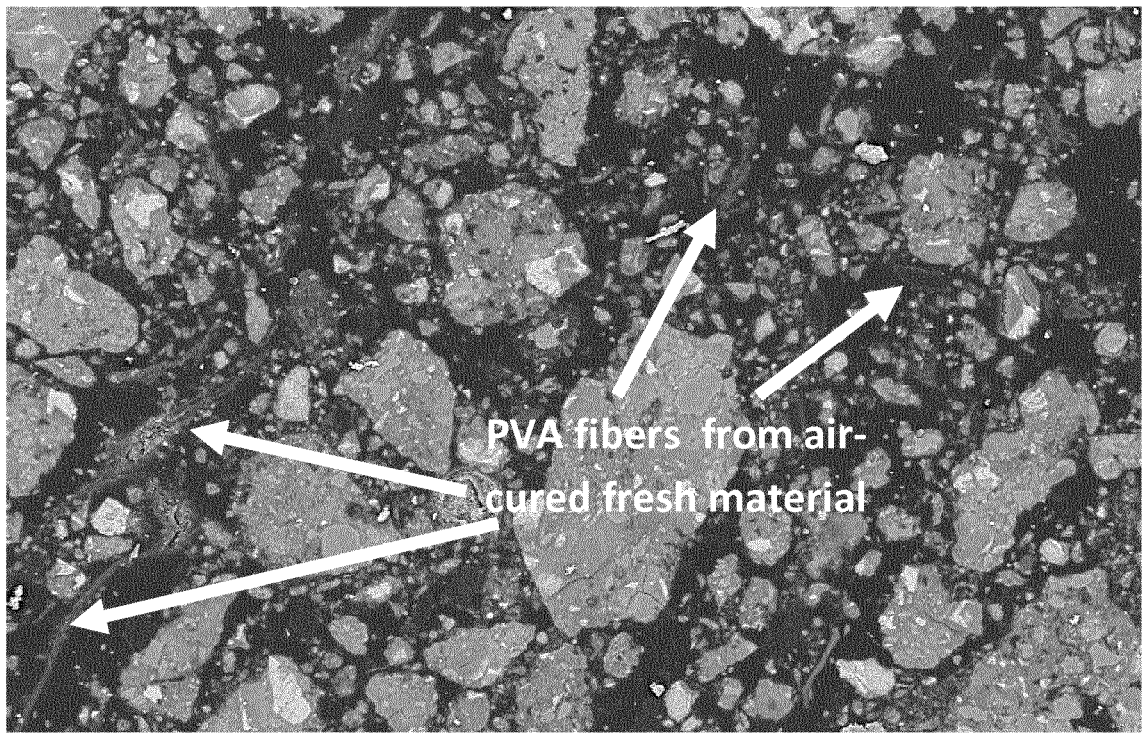

FIG. 22 is a SEM (scan electron microscopy) picture of a sample of fresh air-cured fiber cement product, where the white quartz particles—as observed in recycled air-cured products according to the methods of the present invention—are completely absent.

The same reference signs refer to the same, similar or analogous elements in the different figures.

DETAILED DESCRIPTION OF THE INVENTION

The present invention will be described with respect to particular embodiments.

It is to be noted that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

The following terms are provided solely to aid in the understanding of the invention.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The terms "(fiber) cementitious slurry", "(fiber) cement slurry", "fiber cementitious slurry" or "fiber cement slurry" as referred to herein generally refer to slurries at least comprising water, fibers and cement. The fiber cement slurry as used in the context of the present invention may also further comprise other components, such as but not limited to, limestone, chalk, quick lime, slaked or hydrated lime, ground sand, silica sand flour, quartz flour, amorphous silica, condensed silica fume, microsilica, metakaolin, wollastonite, mica, perlite, vermiculite, aluminum hydroxide, pigments, anti-foaming agents, flocculants, and other additives.

"Fiber(s)" present in the fiber cement slurry as described herein may be for example process fibers and/or reinforcing fibers which both may be organic fibers (typically cellulose fibers) or synthetic fibers (polyvinylalcohol, polyacrilonitrile, polypropylene, polyamide, polyester, polycarbonate, etc.).

"Cement" present in the fiber cement slurry as described herein may be for example but is not limited to Portland cement, cement with high alumina content, Portland cement of iron, trass-cement, slag cement, plaster, calcium silicates formed by autoclave treatment and combinations of particular binders. In more particular embodiments, cement in the products of the invention is Portland cement.

The term "water-permeable" as used herein when referring to a water-permeable (region of a) transport belt generally means that the material of which the water-permeable (region of the) belt is made allows water to flow through its structure to a certain extent.

The term "bulk density" as referred to herein, is to be understood as the property of a powder or granules, or another particulate solid, especially in reference to mineral components (cement particles, filler particles, or silica particles). The bulk density is expressed in kilogram per cubic meter (1 g/ml=1000 kg/m$^3$) or in grams per milliliter (g/ml) because the measurements are made using cylinders. It may also be expressed in grams per cubic centimetre (g/cm$^3$). The bulk density is defined as the weight of a certain amount of particles of a specific material divided by the total volume this amount of particles occupies. The total volume includes particle volume, inter-particle void volume, and internal pore volume. The bulk density of powders as referred to herein is also called the "freely settled" or "poured" density, i.e. the bulk density measured after pouring the powder, without applying any further compaction process.

The bulk density of a powder can be determined by any standard method for measuring bulk density as know to the skilled person.

For instance, the bulk density of a powder can be determined by measuring the volume of a known mass of powder sample, that may have been passed through a sieve, into a graduated cylinder (below described as method A), or by measuring the mass of a known volume of powder that has been passed into a measuring vessel (below described as method B).

Method A. Measurement in a Graduated Cylinder

Procedure. Pass a quantity of powder sufficient to complete the test through a sieve with apertures greater than or equal to 1.0 mm, if necessary, to break up agglomerates that may have formed during storage; this must be done gently to avoid changing the nature of the material. Into a dry graduated cylinder of 250 ml (readable to 2 ml), gently introduce, without compacting, approximately 100 g of the test sample (m) weighed with 0.1% accuracy. Carefully level the powder without compacting, if necessary, and read the unsettled apparent volume (V0) to the nearest graduated unit. Calculate the bulk density in (g/ml) using the formula m/V0. Generally, replicate determinations are desirable for the determination of this property.

If the powder density is too low or too high, such that the test sample has an untapped apparent volume of either more than 250 ml or less than 150 ml, it is not possible to use 100 g of powder sample. Therefore, a different amount of powder has to be selected as test sample, such that its untapped apparent volume is 150 ml to 250 ml (apparent volume greater than or equal to 60% of the total volume of the cylinder); the mass of the test sample is specified in the expression of results.

For test samples having an apparent volume between 50 ml and 100 ml a 100 ml cylinder readable to 1 ml can be used; the volume of the cylinder is specified in the expression of results.

Method B. Measurement in a Vessel

Apparatus. The apparatus consists of a 100 ml cylindrical vessel of stainless steel. Procedure. Pass a quantity of powder sufficient to complete the test through a 1.0 mm sieve, if necessary, to break up agglomerates that may have formed during storage and allow the obtained sample to flow freely into the measuring vessel until it overflows. Carefully scrape the excess powder from the top of the vessel. Determine the mass (M0) of the powder to the nearest 0.1% by subtraction of the previously determined mass of the empty measuring vessel. Calculate the bulk density (g/ml) using the formula M0/100 and record the average of three determinations using three different powder samples.

A "(fiber cement) sheet" or "fiber cement sheet" or "sheet" as interchangeably used herein, and also referred to as a panel or a plate, is to be understood as a flat, usually rectangular element, a fiber cement panel or fiber cement sheet being provided out of fiber cement material. The panel or sheet has two main faces or surfaces, being the surfaces with the largest surface area. The sheet can be used to provide an outer surface to walls, both internal as well as external a building or construction, e.g. as façade plate, siding, etc.

The present invention novel and improved methods for the production of fresh air-cured fiber cement products by using comminuted cured fiber cement waste material as one of the raw materials.

In particular, it was found by the inventors that the amount of fiber cement waste used for the production of fiber cement products is essential for the improvement of the characteristics of the end product. More particularly, it was found that the aqueous fiber cement slurry, which is to be used as a starting material for the production of the fresh fiber cement products, should contain less than about 40M % of fiber cement waste of the dry basis of said slurry, and preferably between about 5M % and about 35M % of fiber cement waste of the dry basis of said slurry, more preferably between about 5M % and about 25M % of fiber cement waste of the dry basis of said slurry, most preferably between about 5M % and about 25M % of fiber cement waste of the dry basis of said slurry. The inventors have observed that when using less than about 40M % of fiber cement waste in the fiber cement slurry for the production of fresh fiber cement products, the water absorption of the fresh air-cured products decreases or at least remains stable as compared to fresh air-cured products not containing any fiber cement waste, and the density decreases. This observation is in contrast to what is normally seen when trying to decrease the density of fiber cement products by known methods, where typically a lower density results in an undesired increase of water absorption.

The main advantage of producing fiber cement sheets or boards with lower densities compared to conventional (i.e. non-waste containing or non-recycled) fiber cement products is that the products obtained by the methods according to the present invention are lighter than non-waste-based products of equal dimension and as a consequence have an improved workability. Workability encompasses the ease with which the board is handled and installed.

In a first aspect, the present invention provides methods for the production of air-cured fiber cement products, at least comprising the steps of:
- (a) Providing cured fiber cement powder by comminuting cured fiber cement material;
- (b) Providing an aqueous fiber cement slurry comprising water, cementitious binder, natural or synthetic fibers and less than about 40M % of said cured fiber cement powder;
- (c) Providing a green fiber cement sheet; and
- (d) Air-curing said green fiber cement sheet thereby providing an air-cured fiber cement product.

The unit "M %" refers to the mass percentage of the component over the total dry mass of the composition, i.e. all components except free water.

The first step in the methods according to the present invention comprises providing a cured fiber cement powder by comminuting cured fiber cement material.

The cured fiber cement material, which is to be comminuted, is typically waste material, e.g. demolition waste, production waste from the fiber cement production plant, waste from the construction sites or rejected fiber cement products. The comminuted cured fiber cement material, typically in form of cured fiber cement powder, can be used as raw material for fresh air-cured fiber cement products, in which the cured fiber cement powder is recycled.

Cured fiber cement powder for use in fresh air-cured fiber cement products, preferably, though not necessarily, is air-cured comminuted fiber cement powder.

In the alternative, the cured fiber cement product, being comminuted to provide cured fiber cement powder, may be autoclave-cured comminuted fiber cement powder.

In certain particular embodiments, comminuting the cured fiber cement material is done by making use of a pendular mill. In further particular embodiments, the methods for the production of comminuted cured fiber cement material further comprise the step of drying the cured fiber cement material during comminuting in the pendular mill. In yet further particular embodiments, the step of drying the cured fiber cement material during comminuting in the pendular mill is performed by injecting hot air in the pendular mill during comminuting.

In particular embodiments, the cured fiber cement material for use as a starting material for the production of comminuted cured fiber cement material has a water content of less than or equal to about 10% w. In further particular embodiments, the cured fiber cement material for use as a starting material for the production of comminuted cured fiber cement material has a water content of less than or equal to about 10% w, such as less than or equal to about 8% w, for example less than or equal to about 6% w, such as less than or equal to about 5% w.

In certain particular embodiments, the cured fiber cement material for use as a starting material for the production of comminuted cured fiber cement material is air-cured fiber cement material.

Figure 5:
FIG. 5 shows the volume percentage of particles in function of the particle size class.

Alternatively, autoclave cured fiber cement product may be comminuted to provide the cured fiber cement powder. A combination of air-cured and autoclave-cured fiber cement product may be comminuted, or air-cured fiber cement powder and autoclave-cured fiber cement powder maybe combined to provide the cured fiber cement powder. One of the most important advantages of the comminuted fiber cement powder as produced according to the methods of the invention is that the particles have a granulated, sand-like texture and have a flowing behavior that is similar to the flowing behavior and the bulk density (as defined herein) of cementitious powder, silica flour or limestone flour (see e.g. FIG. 5). In particular embodiments, the comminuted powder as produced by the methods according to the present invention is specifically characterized by a bulk density 1000 kg/m$^3$ and 1600 kg/m$^3$, and preferably between 1000 kg/m$^3$ and 1300 kg/m$^3$.

In this way, the powder is suitable to be recycled into fresh fiber cement products, without the necessity to make major changes in the production process (e.g. the Hatschek process) for producing fresh cured fiber cement products, i.e. either air-cured or autoclave-cured fiber cement products.

Figure 1:
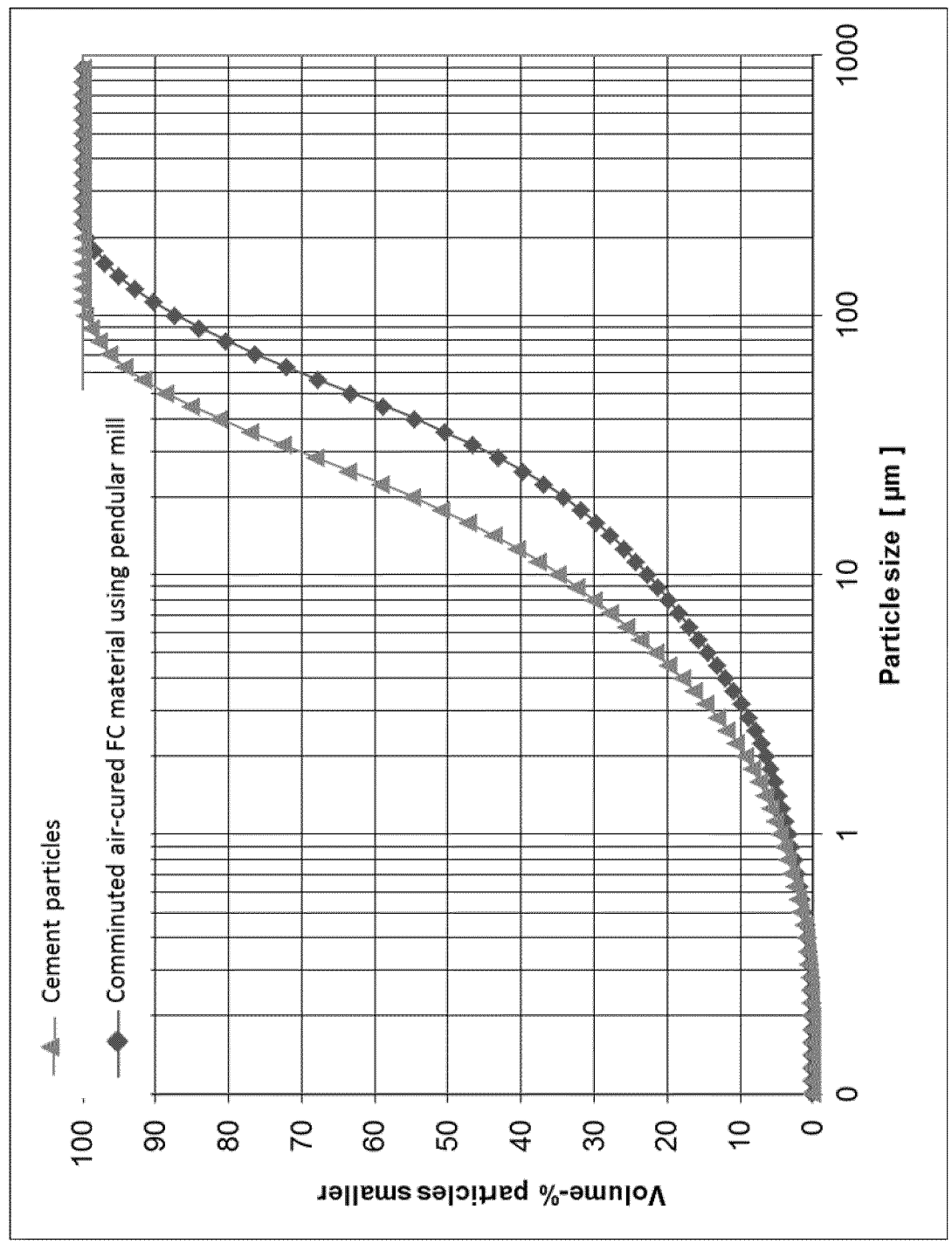
FIG. 1 shows the particle size distribution curves of cement particles and of comminuted fiber cement powder as produced by the methods according to the present invention. Cement samples as well as air-cured fiber cement slate samples were each milled using a pendular mill type roller mill of the Poittemill Group (FR). The particle size distribution was then measured for both types of samples via laser beam diffraction in dry dispersion at 3 bar with a Malvern MasterSizer 2000.
Figure 2:
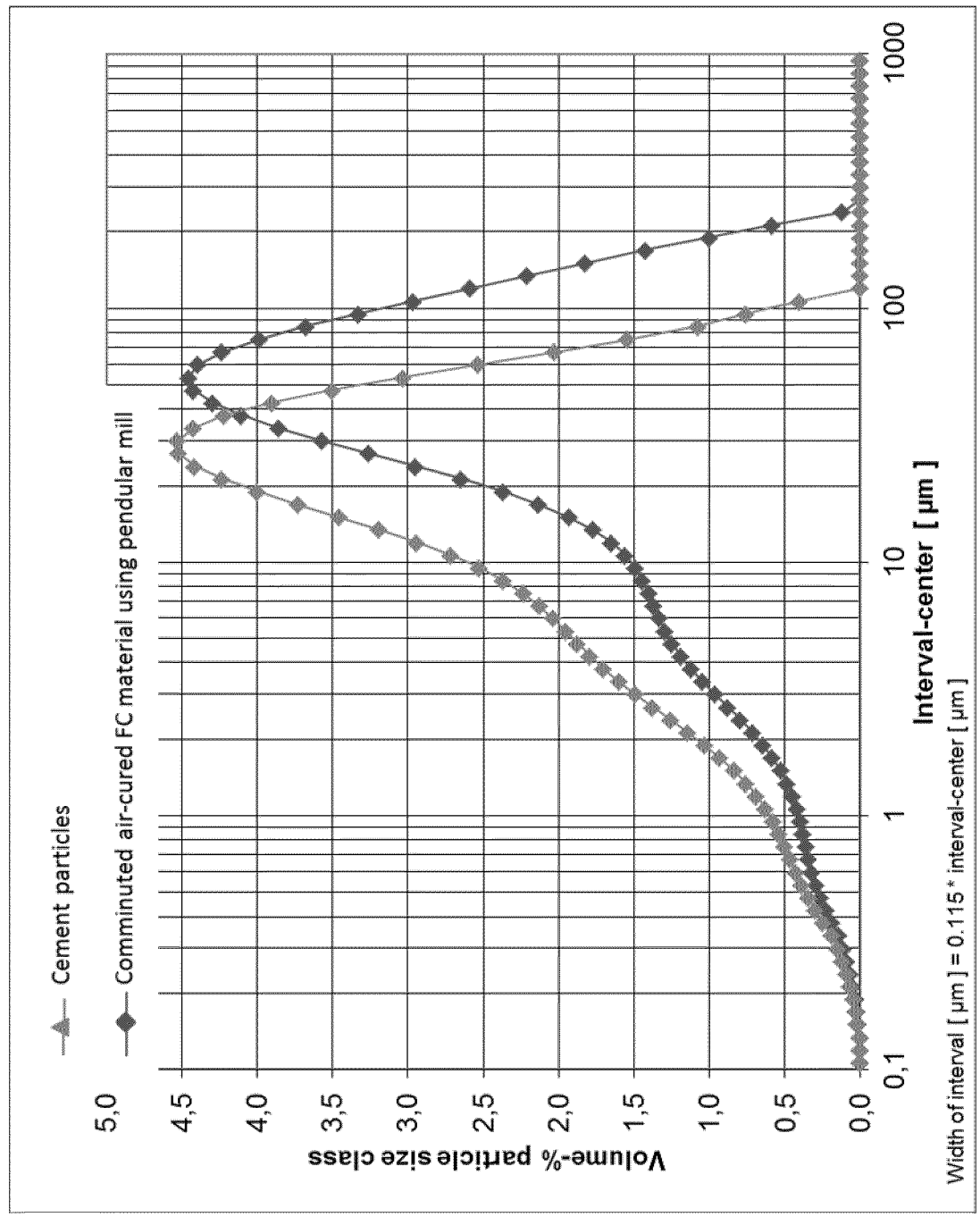
FIG. 2 shows the volume percentage of smaller particles in function of the particle size.
Figure 3:
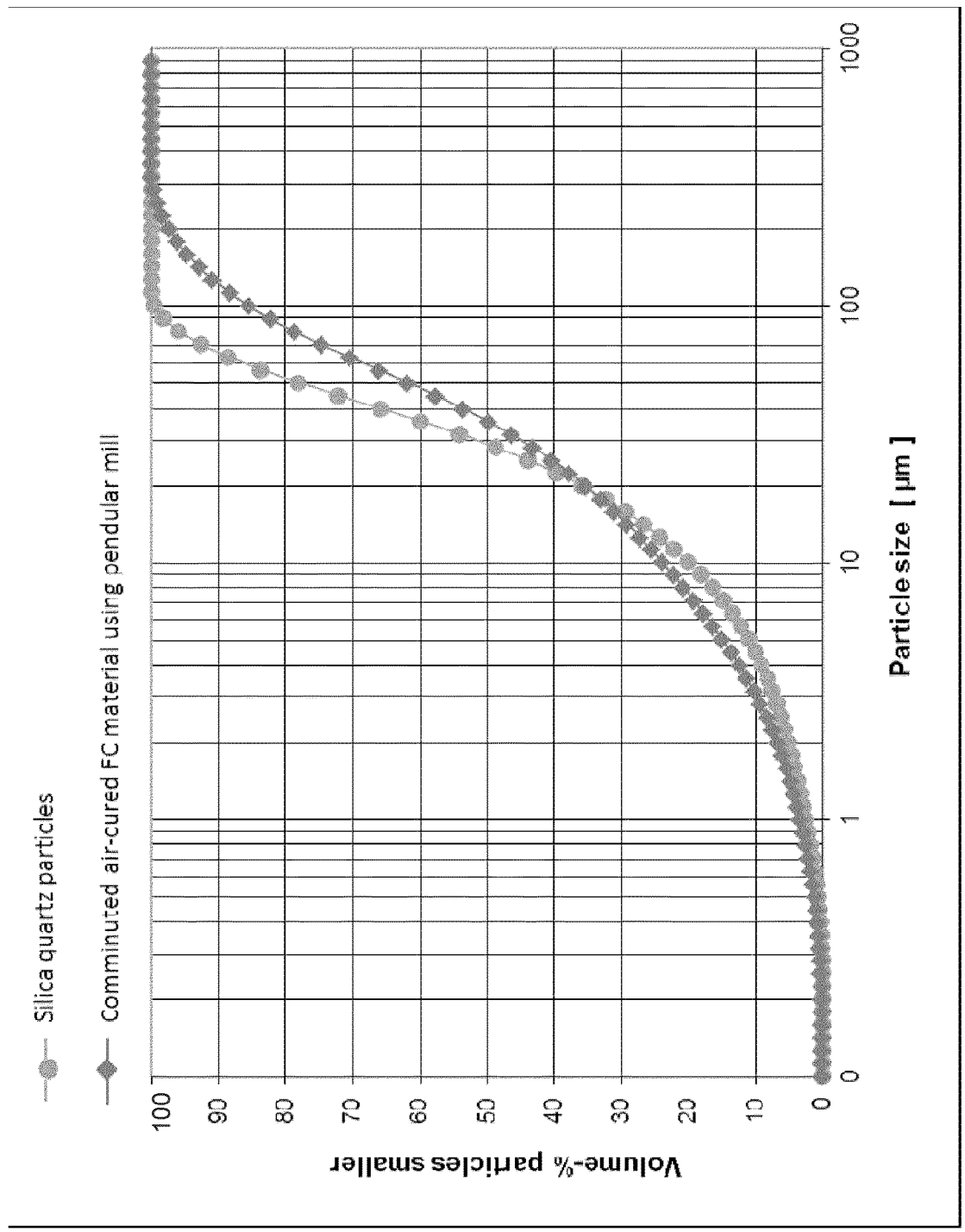
FIG. 3 shows the volume percentage of particles in function of the particle size class.
Figure 4:
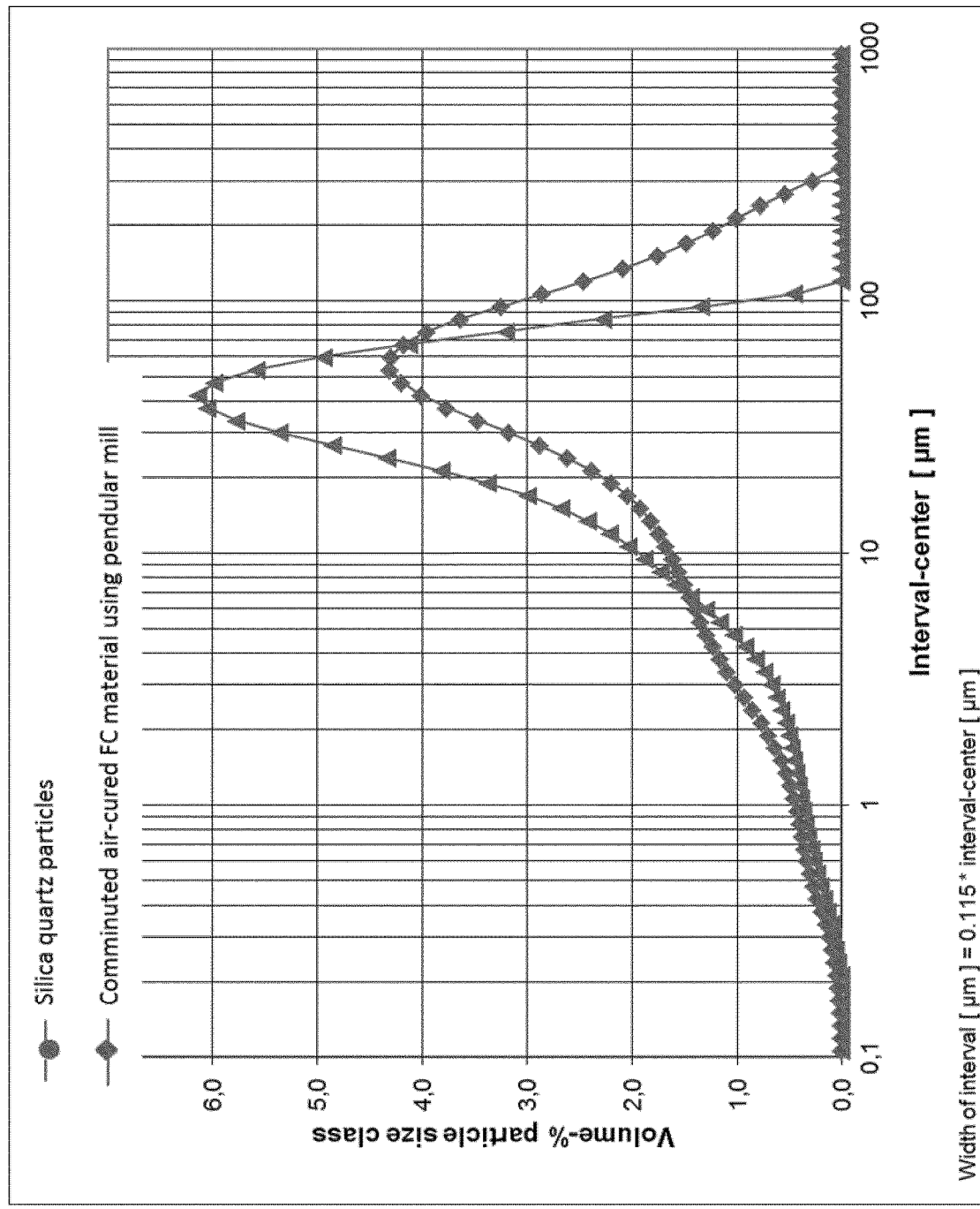
FIG. 4 shows the volume percentage of smaller particles in function of the particle size.

Moreover, the produced cured fiber cement powder particles of the invention have a particle size distribution, which is similar to the particle size distribution of a cementitious binder material (e.g. cement) or a siliceous source (e.g. sand or quartz) or a filler material (e.g. $CaCO_3$). In particular embodiments, the produced cured fiber cement powder particles are characterized by a particle size distribution, which is similar to the particle size distribution of cement (see for example FIGS. 1 and 2). In particular embodiments, the produced cured fiber cement powder particles are characterized by a particle size distribution, which is similar to the particle size distribution of a siliceous source (see for example FIGS. 3 and 4).

With "the matching of particle size distribution" of different materials, such as cement, fillers, siliceous material (e.g. sand) and the comminuted fiber cement product, as used herein is meant that these materials can be used together in a process to provide a fiber cement slurry for making fresh air-cured fiber cement products, in particular using a Hatschek process, without the necessity to fundamentally change the process settings.

Thus, the cured fiber cement powder may replace part of the filler, such as limestone, and/or cement used to provide the fresh air cured fiber cement sheets. The cured fiber cement powder may replace part of the cement used to provide the fresh air-cured fiber cement material, and/or may replace part of the siliceous source (e.g. part of the ground sand) for autoclave-cured fiber cement products, and/or may replace part of the fillers (e.g. ground limestone) used in autoclave-cured or air-cured fiber cement products.

Preferably the cured fiber cement material, which is provided as the starting material for the production of comminuted cured fiber cement material, is provided in parts having a maximum size of not more than 5 cm, typically as rectangular-like pieces with a sides of not more than 3 cm or even mot more than 2 cm, before it is comminuted, for example by using a pendulum mill. In this context, a part with a size of not more than A cm means that the largest length of the particle is not more than A cm.

In FIGS. 1 to 4, the distributions of the particle size of milled cured fiber cement slates versus cement particles (FIGS. 1 and 2) and versus silica particles (FIGS. 3 and 4) are depicted. The air-cured fiber cement slates, obtainable as Alterna from Eternit NV Belgium, were first pre-crushed to such that the not more than 2 by 2 cm. The total humidity of the pre-crushed cured fiber cement waste material, in this case air cured fiber cement material, was about 5%-6% w based upon dry weight.

The % w based upon dry weight is the weight difference between the material as samples and the material dried in a ventilated furnace at 105° C. until constant weight is obtained.

This pre-crushed material was fed at a flow rate of about 350 kg/hr to about 800 kg/hr to a pendular mill type roller mill of the Poittemill Group (FR), in which the material was comminuted at a rotation speed of between about 100 and about 400 tr/min. To compensate the humidity of the pre-crushed material, hot air (at a temperature between about 20° C. and about 100° C.) was fed together with the pre-crushed material, in order to instantaneously suppress the humidity of the pre-crushed material and the ground fiber cement powder obtained.

As such the comminuted cured fiber cement material was obtained of which the particle size distribution curve, measured using laser beam diffraction on dry dispersed material at 3 bar by means of the apparatus Malvern mastersizer 2000, was obtained.

This fiber cement powder as obtained by pendular milling had a good consistency (not woolly or fluffy), a suitable bulk density (between about 1000 kg/m$^3$ and about 1300 kg/m$^3$) and a good particle distribution, to be used for the production of fresh fiber cement products. Without being bound to any hypothesis or theory, the present inventors believe that the pendular milling as used in the methods according to the present invention provides a novel and improved comminuted fiber cement waste powder because with this technique the fiber cement waste is squashed or flattened as opposed to other milling techniques, which typically mill by crushing or grinding.

In particular embodiments, the desired particle distribution of the comminuted cured fiber cement material according to the methods of the present invention can be obtained by milling the cured fiber cement material in the absence of sand or another silica source. This further facilitates the comminuted cured fiber cement material to be used as a good raw material for both fresh air cured and autoclave cured fiber cement waste material.

In further particular embodiments, comminuting of the cured fiber cement material is done in so-called dry state, i.e. the provided cured fiber cement material is not to be brought in suspension of a liquid (typically water) to enable the milling, as is the case for some other milling techniques. As a result, a relatively dry comminuted cured fiber cement material in form of powder is provided. This facilitates storage of an intermediate product before using it for e.g. making fresh cured fiber cement waste material, being fresh air cured and autoclave cured fiber cement waste material.

The second step of the methods according to the present invention comprises providing an aqueous fiber cement slurry comprising water, cementitious binder, natural or synthetic fibers and the cured fiber cement powder. In particular embodiments, the fiber cement slurry comprises at least 5M % of cured fiber cement powder, advantageously at least 10M % of cured fiber cement powder. In further particular embodiments, the fiber cement slurry comprises preferably less than 40M % of cured fiber cement powder, advantageously less than 35M % of cured fiber cement powder, more advantageously less than 20M % of cured fiber cement powder, even less than 15M %.

In further particular embodiments of the methods according to the invention, the step of providing an aqueous fiber cement slurry comprises mixing at least water, cementitious binder, natural or synthetic fibers and the cured fiber cement powder, such that the cured fiber cement powder is present in the aqueous fiber cement slurry in an amount of between about 5M % and about 40M %, preferably between about 5M % and about 30M %, more preferably between about 5M % and about 20M %, most preferably between about 5M % and about 15M % of the dry basis of said slurry.

In this respect of the above, the unit "M %" refers to the mass percentage of the component over the total dry mass of the composition, i.e. all components except water.

In the next step of the methods of the present invention, the fresh fiber cement materials or products are made out of fiber cement slurry, which is formed in a so-called green fiber cement product.

The fiber cement slurry typically comprises water, process and reinforcing fibers which both may be natural organic fibers (typically cellulose fibers) and synthetic organic fibers (polyvinylalcohol, polyacrilonitrile, polypropylene, polyamide, polyester, polycarbonate, polyethylene, etc.), which fibers may be surface treated (chemically or mechanically) or not, synthetic inorganic fibers, such as glass fibers, cement e.g. Portland cement, limestone, chalk, quick lime, slaked or hydrated lime, ground sand, silica sand flour, quartz flour, amorphous silica, condensed silica fume, microsilica, metakaolin, wollastonite, mica, perlite, vermiculite, aluminum hydroxide, anti-foaming agents, flocculants, and other additives such as hydrophobation agents or water repellants. Optionally, a color additive (e.g. pigments) can be added in order to obtain a fiber cement product which is so-called colored in the mass.

Fiber cement products, also referred to as fiber cement sheets or fiber cement panels, usually are made using the well-known Hatschek-process, flow-on process or Magnani-process, or suitable combinations thereof.

In particular embodiments, the green fiber cement products are optionally pressed before curing.

In particular embodiments, the optional step of pressing the green fiber cement product is performed by making use of one or more mechanical presses, including but not limited to one or more stack presses.

In particular embodiments, the optional step of pressing the green fiber cement product is performed at a pressure of between about 180 kg/cm$^2$ and about 250 kg/cm$^2$, such as between about 200 kg/cm$^2$ and about 240 kg/cm$^2$, such as about 230 kg/cm$^2$.

In particular embodiments of the methods according to the invention, the optional step of pressing the green fiber cement product comprises compressing the green fiber cement sheet during a time period of between about 5 minutes and about 15 minutes, such as between about 5 minutes and about 10 minutes, such as between about 5 minutes and about 7 minutes, preferably about 6 minutes.

The pressure applied to the green, i.e. uncured, fiber cement sheet causes the density of the green fiber cement sheet to increase (see for example Table 2).

The density of the fiber cement end products as obtained using the methods according to the present invention, may vary from about 1.0 kg/dm$^3$ to about 2.5 kg/dm$^3$, such as from about 1.3 kg/dm$^3$ to about 2.0 kg/dm$^3$, preferably about 1.5 kg/dm$^3$.

In particular embodiments, the unpressed green fiber cement sheet may have a thickness in the range of about 3 mm and about 25 mm, such as between about 4 mm and about 20 mm, such as between about 4 mm and about 12 mm, preferably about 5 mm.

In particular embodiments, the pressed green fiber cement sheet has a thickness in the range of between about 2 mm and about 20 mm, such as between about 3 mm and about 15 mm, such as between about 3 mm and about 10 mm, preferably about 4 mm.

Finally, the methods of the present invention comprise the step of air-curing the fiber cement sheet thereby providing a fresh air-cured fiber cement product.

The "green" fiber cement product, after being made by a sheet providing process, such as the Hatschek-process and being pressed, may be first pre-cured to the air, after which the pre-cured product is further air cured until it has its final strength.

The fresh green sheets, after being provided, may be stacked with metal sheets placed between the stacked green fiber cement sheets, and pressed in stacked form. Alternatively, the fresh green sheets may be pressed individually and thereafter stacked with metal sheets placed between the stacked and pressed green fiber cement sheets. The fresh green sheets may be formed, like undulated, before being stacked with intermediate, formed metal sheets placed between the fiber cement sheets. For formed, e.g. undulated sheets, the sheets are typically pressed individually.

The pre-curing step may take several hours, e.g. between about 1 hour and 10 hours, such as between 2 hours and 8 hours, such as between 3 hours and 5 hours, preferably about 4 hours, during which the temperature of the sheets rise due to the exothermic curing reaction of the cement. The pre-curing may take place in controlled conditions controlling the humidity, temperature or both.

After a first 'pre-curing' step, curing the green sheets to the air in stacked form with intermediate metal sheets, the sheets may be restacked while removing the metal sheets from between the green fiber cement pre-cured sheets. After removal of the metal plates, the pre-cured green fiber cement sheets are further cured to the air during a curing step, which may take several days, typically 2 to 4 weeks.

The thickness of the fiber cement end products as obtained using the methods according to the present invention, may vary from about 4 mm to about 20 mm, such as from about 7 mm to about 13 mm.

The length and width of the fiber cement end products as obtained using the methods according to the present invention, may vary from about 1 meter to about 1.7 meter in width and from about 1 meter to about 3.6 meter in length.

In a further aspect, the present invention provides air-cured fiber cements products as obtained by the methods of the invention.

In a further aspect the present invention provides uses of the air-cured fiber cements products as obtained by the methods of the invention, as a building material.

It is an advantage of certain embodiments of the present invention that the resulting air cured fiber cement sheets are suitable and may be used as undulated roof sheets, roof tiles and other products which require the presence of a high amount of cement.

The invention will now be further illustrated in detail with reference to the following Examples.

EXAMPLES

It will be appreciated that the following examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention that is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

Example 1

Production of Air-Cured Comminuted Fiber Cement Powder as Produced with a Pendular Mill According to the Methods of the Invention In particular embodiments, the desired particle distribution of air-cured comminuted fiber cement material according to the methods of the present invention can be obtained by milling air-cured fiber cement material in the absence of sand or another silica source. This further facilitates the comminuted cured fiber cement material to be used as a good raw material for both fresh air cured and autoclave cured fiber cement waste material.

In further particular embodiments, comminuting of the cured fiber cement material is done in so-called dry state at a humidity of between about 5% to about 10%, preferably between about 5% to about 6%. The provided cured fiber cement material is thus not to be brought in suspension of a liquid (typically water) to enable the milling, as is the case for some other milling techniques. As a result, a relatively dry comminuted cured fiber cement material in the form of powder is provided. This facilitates storage of an intermediate product before using it for e.g. making fresh cured fiber cement waste material, being fresh air cured and autoclave cured fiber cement waste material.

The cured fiber cement powder obtained by comminuting cured fiber cement material according to the methods of the present invention has a particle size distribution as shown for example in FIGS. 1 to 4. As can be derived from the FIGS. 1 to 4, the particle distribution is similar to that of the standard fresh starting materials to produce fiber cement, e.g. cementitious particles, ground silica particles and/or ground lime particles.

In particular embodiments of the methods of the present invention, the cured fiber cement material is fed to a pendular mill (i.e. for comminuting) as parts having maximum size of not more than 5 cm, typically as rectangular-like pieces with a sides of not more than 3 cm or even not more than 2 cm. In the context of the present invention, a part with a size of not more than A cm means that the largest length of the particle is not more than A cm.

In FIGS. 1 to 4, the distributions of the particle size of milled cured fiber cement slates versus cement particles (FIGS. 1 and 2) and versus silica particles (FIGS. 3 and 4) are depicted. The air-cured fiber cement slates, obtainable as Alterna from Eternit NV Belgium, were first pre-crushed to such that the not more than 2 by 2 cm. The total humidity of the pre-crushed cured fiber cement waste material, in this case air cured fiber cement material, was about 5%-6% w based upon dry weight.

The % w based upon dry weight is the weight difference between the material as samples and the material dried in a ventilated furnace at 105° C. until constant weight is obtained.

This pre-crushed material was fed at a flow rate of about 350 kg/hr to about 800 kg/hr to a pendular mill type roller mill of the Poittemill Group (FR), in which the material was comminuted at a rotation speed of between about 100 and about 400 tr/min. To compensate the humidity of the pre-crushed material, hot air (at a temperature between about 20° C. and about 100° C.) was fed together with the pre-crushed material, in order to instantaneously suppress the humidity of the pre-crushed material and the ground fiber cement powder obtained.

As such the comminuted cured fiber cement material was obtained of which the particle size distribution curve, measured using laser beam diffraction on dry dispersed material at 3 bar by means of the apparatus Malvern mastersizer 2000, was obtained.

This fiber cement powder as obtained by pendular milling had a good consistency (not woolly or fluffy), a suitable bulk density (between about 1000 kg/m$^3$ and about 1300 kg/m$^3$) and a good particle distribution, to be used for the production of fresh fiber cement products.

Example 2

Production of Air-Cured Fiber Cement Slates Comprising from 5M % to 10M % of Air-Cured Comminuted Fiber Cement Powder as Produced According to the Methods of the Invention The fiber cement powder, obtained as described in Example 1, was used to produce fresh fiber cement slates, i.e. fresh fiber cement air cured products.

For the production of fiber cement slates, typically the following formulation of an aqueous fiber cement slurry is used:

73 to 80 M % Cement such as Portland cement
3 to 4 M % cellulose fibers (such as softwood unbleached Kraft pulp)
1.5 to 1.9 M % polyvinylalcohol fibers
10 to 18 M % of carbonaceous filler (typically limestone) and optionally a minor amount of other additives.

M % refers to the mass of the component over the total mass of all components except free water, i.e. the dry matter.

A series of 5 test slurry samples was produced (see Table 1 below: samples 2 to 6), wherein at least part or all of the carbonaceous filler, or at least part of the cement, or part of both the carbonaceous filler and the cement, was replaced by the comminuted cured fiber cement powder as obtained using the comminuting method explained in Example 1. In addition, 2 reference slurry samples (see Table 1 below: samples 1 and 7) were produced, not containing any comminuted waste powder.

As such, the following 7 fiber cement slurry formulations were obtained:

The fiber cement slurry formulations as presented in Table 1 were used to provide green sheets of fiber cement on a state of the art Hatschek production machine.

Half of the green sheets were pressed at 230 kg/cm$^2$ and air-cured by subjecting them to a curing at 60° C. for 8 hours, and thereafter curing at ambient conditions. The other half of the green sheets was left unpressed and air-cured by subjecting them to a curing at 60° C. for 8 hours, and thereafter curing at ambient conditions.

The densities of reference sample 1 and test samples 3 and 4 (of which the formulations are provided in Table 1) were measured, both of unpressed and pressed samples (see Table 2).

TABLE 2

| Densities (g/cm$^3$) of samples 1, 3, and 4, unpressed and pressed | | | | | | |
|---|---|---|---|---|---|---|
| | Reference sample 1 | | Test sample 3 | | Test sample 4 | |
| | Unpressed | Pressed | Unpressed | Pressed | Unpressed | Pressed |
| Density | 1.50 | 1.80 | 1.48 | 1.78 | 1.465 | 1.77 |

As can be seen from Table 2 above, the density of fiber cement products containing waste is reduced as compared to the reference not containing any waste, both in the case of unpressed and pressed samples.

The air-cured sheets were subsequently cut into appropriate dimensions and coated, to provide air-cured fiber cement slates.

After 29 days, the formed air-cured sheets were analyzed for their physico-mechanical characteristics, i.e. modulus of rupture (MOR; expressed in Pa=kg/m·s$^2$). The modulus of rupture (MOR; expressed in Pa=kg/m·s$^2$) was measured by making use of a UTS/INSTRON apparatus (type 3345; cel=5000N).

Also, the water absorption as measured by a Karsten test was determined. The test was performed both under air-dry and water-saturated conditions (air-dry condition is obtained by conditioning the samples in a ventilated oven at 40° C. during 3 days; water-saturated condition is obtained by immersion of the samples in tap water at room temperature and atmospheric pressure during 3 days).

For each of the air-dried and water-saturated samples, the thickness of the sample was determined. Subsequently, a Karsten tube was fixed on a central region of each sample

TABLE 1

FC formulations M % samples 1 to 7 (PVA: polyvinylalcohol fiber Kuraray A8; Cellulose: Solombala UKP 60° SR; Condensed silica fume: EMSAC 500S Elkem Materials Ltd.; CaCO$_3$ filler: Calcitec 2001S, Carmeuse SA; Cement: CEMI 42.5N, CBR SA, Lixhe)

| | 1 | 2 | 3 | 4 | 5 | 6 | 7 |
|---|---|---|---|---|---|---|---|
| PVA | 1.8 | 1.8 | 1.8 | 1.8 | 1.8 | 1.8 | 1.8 |
| Cellulose | 3.3 | 3.3 | 3.3 | 3.3 | 3.3 | 3.3 | 3.3 |
| Condensed silica fume | 2.6 | 2.6 | 2.6 | 2.6 | 2.6 | 2.6 | 2.6 |
| CaCO$_3$ filler | 15.0 | 10.0 | 5.0 | — | 15.0 | 10.0 | 15.0 |
| Cement | 77.3 | 77.3 | 77.3 | 77.3 | 72.3 | 72.3 | 77.3 |
| FC waste | — | 5.0 | 10.0 | 15.0 | 5.0 | 10.0 | — |
| Total | 100.00 | 100.00 | 100.00 | 100.00 | 100.00 | 100.00 | 100.00 | using silicone. After 24 hours, the Karsten tube was filled with demineralized water and closed to prevent evaporation. Water absorption (i.e. the volume of water absorped from the Karsten tube by the sample) was determined after 1, 2, 4, 6, 8, 24, 32 and 48 hours.

Figure 6:
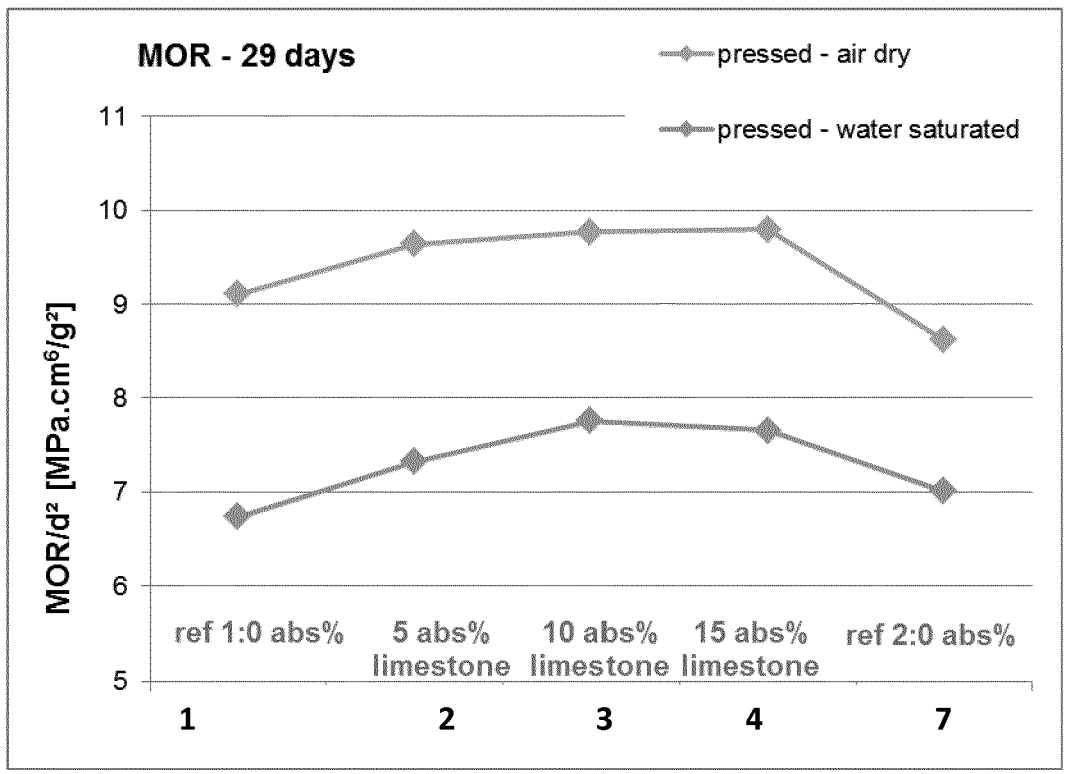
FIGS. 6 and 7 represent the density normalized flexural strength (modulus of rupture; MOR), as measured 29 days after production, of 5 different test samples (samples 2, 3, 4, 5, 6 of which the formulation is presented in Table 1) and two reference samples (samples 1 and 7 of which the formulation is presented in Table 1). The modulus of rupture (MOR; expressed in Pa=kg/m·s$^2$) was measured by making use of a UTS/INSTRON apparatus (type 3345; cel=5000N).
Figure 7:
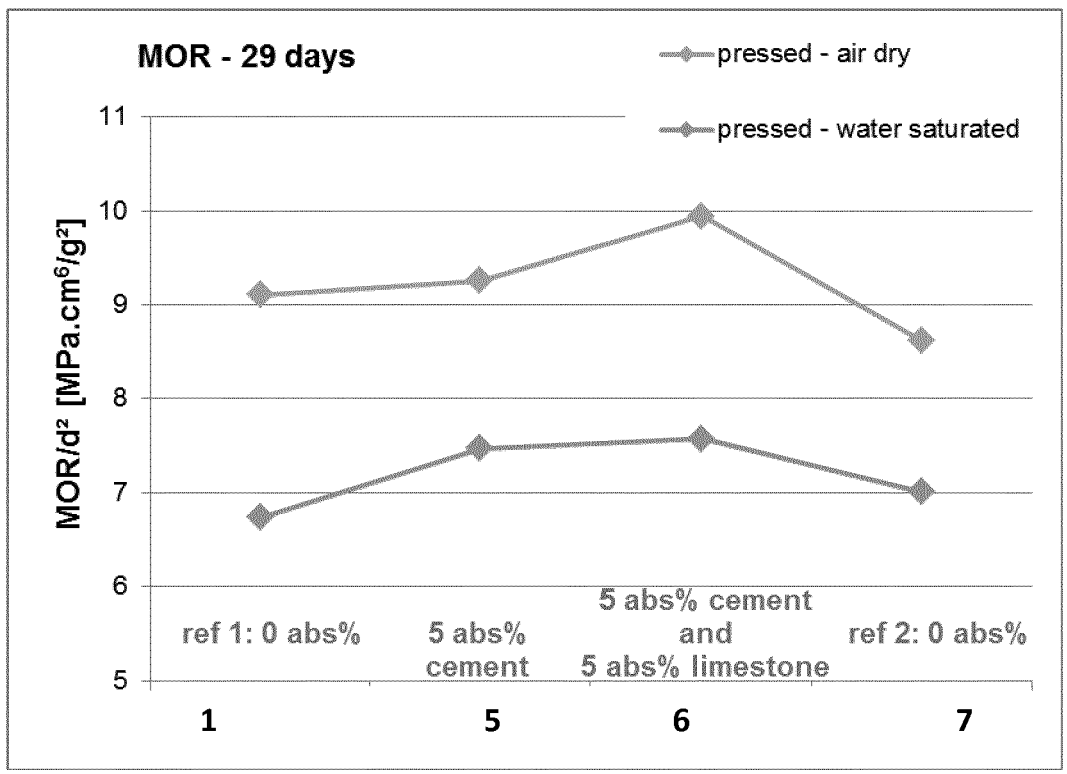

The results are presented in FIGS. 6 and 7.

As can be derived from the graphs in FIGS. 6 and 7, which represent the density normalized flexural strength (modulus of rupture; MOR) of the 5 different test samples (2, 3, 4, 5, 6 of which the formulation is presented in Table 1) and the two reference samples (1 and 7 of which the formulation is presented in Table 1), it can be concluded that the density normalized flexural strength or modulus of rupture (MOR/$d^2$) is higher in the test samples as compared to the reference samples. This means that the samples comprising the comminuted fiber cement waste powder in amounts of between 5M % and 15M % as produced according to the methods of the present invention have a higher strength than reference samples not containing any waste powder.

In addition, based on the results from the Karsten tests (data not shown), it can be concluded that adding the fiber cement waste powder according to the invention in replacement of cement or filler material does not have an effect on the water absorption as compared to reference samples not containing any comminuted fiber cement waste powder.

Thus, from the above, it can be concluded that fiber cement products comprising from 5M % to 15M % of comminuted fiber cement waste powder as produced by the methods of the present invention perform at least comparable and mostly even better than the reference fiber cement products not comprising any comminuted waste powder.

Example 3

Production of Air-Cured Fiber Cement Slates Comprising from 15M % to 40M % of Air-Cured Comminuted Fiber Cement Powder as Produced According to the Methods of the Invention The fiber cement powder, obtained as described in Example 1, was used to produce fresh fiber cement slates, i.e. fresh fiber cement air cured products.

For the production of fiber cement slates, typically the following formulation of an aqueous fiber cement slurry is used:

73 to 80 M % Cement such as Portland cement
3 to 4 M % cellulose fibers (such as softwood unbleached Kraft pulp)
1.5 to 1.9 M % polyvinylalcohol fibers
10 to 18 M % of carbonaceous filler (typically limestone) and optionally a minor amount of other additives.

M % refers to the mass of the component over the total mass of all components except free water, i.e. the dry matter.

A series of 6 test slurry samples was produced (see Table 3 below: samples 9 to 14), wherein at least part or all of the carbonaceous filler, or at least part of the cement, or part of both the carbonaceous filler and the cement, was replaced by the comminuted cured fiber cement powder as obtained using the comminuting method explained in Example 1. In addition, 2 reference slurry samples (see Table 3 below: samples 8 and 15) were produced, not containing any comminuted waste powder.

As such, the following 8 fiber cement slurry formulations were obtained:

TABLE 3

FC formulations M % samples 8 to 15 (PVA: polyvinylalcohol fiber Kuraray A8; Cellulose: Solombala UKP 60° SR; Condensed silica fume: EMSAC 500S Elkem Materials Ltd.; CaCO₃ filler: Calcitec 2001S, Carmeuse SA; Cement: CEMI 42.5N, CBR SA, Lixhe)

|  | 8 | 9 | 10 | 11 | 12 | 13 | 14 | 15 |
|---|---|---|---|---|---|---|---|---|
| PVA | 1.8 | 1.8 | 1.8 | 1.8 | 1.8 | 1.8 | 1.8 | 1.8 |
| Cellulose | 3.3 | 3.3 | 3.3 | 3.3 | 3.3 | 3.3 | 3.3 | 3.3 |
| Condensed silica fume | 2.6 | 2.6 | 2.6 | 2.6 | 2.6 | 2.6 | 2.6 | 2.6 |
| CaCO₃ filler | 15.0 | 0.0 | 0.0 | 0.0 | 0.0 | 0.0 | 0.0 | 15.0 |
| Cement | 77.3 | 77.3 | 72.3 | 67.3 | 62.3 | 57.3 | 52.3 | 77.3 |
| FC waste | 0.0 | 15.0 | 20.0 | 25.0 | 30.0 | 35.0 | 40.0 | 0.0 |
| Total | 100.00 | 100.00 | 100.00 | 100.00 | 100.00 | 100.00 | 100.00 | 100.00 |

The fiber cement slurry formulations as presented in Table 2 were used to provide green sheets of fiber cement on a state of the art Hatschek production machine. Half of the green sheets were pressed at 230 kg/cm² and air-cured by subjecting them to a curing at 60° C. for 8 hours, and thereafter curing at ambient conditions. The other half of the green sheets was left unpressed and air-cured by subjecting them to a curing at 60° C. for 8 hours, and thereafter curing at ambient conditions.

The air-cured sheets were subsequently cut into appropriate dimensions and coated, to provide air-cured fiber cement slates.

After 7 days and after 29 days, the formed air-cured sheets were analyzed for their physico-mechanical characteristics, i.e. modulus of rupture (MOR).

The modulus of rupture (MOR; expressed in Pa=kg/m·s²) was measured by making use of a UTS/INSTRON apparatus (type 3345; cel=5000N).

The density of the samples was measured by first saturating the samples during 72 hours in tap water. The weight of the samples was subsequently determined both under saturated and immersed conditions. Afterwards, the samples were placed to dry for 48 hours at about 105° C. For each of the dried samples, the weight was determined again. The density (X) for each sample was calculated by dividing the dry weight (C) by the difference between the immersed weight (B) and the saturated weight (A), according to the following formula: X=C/(A−B).

Finally, the water absorption as measured by a Karsten test was determined. The test was performed both under air-dry and water-saturated conditions (air-dry condition is obtained by conditioning the samples in a ventilated oven at 40° C. during 3 days; water-saturated condition is obtained by immersion of the samples in tap water at room temperature and atmospheric pressure during 3 days).

For each of the air-dried and water-saturated samples, the thickness of the sample was determined. Subsequently, a Karsten tube was fixed on a central region of each sample using silicone. After 24 hours, the Karsten tube was filled with demineralized water and closed to prevent evaporation. Water absorption (i.e. the volume of water absorbed from the Karsten tube by the sample) was determined after 1, 2, 4, 6, 8, 24, 32 and 48 hours.

The results are presented in FIGS. 8 to 13.

Figure 8:
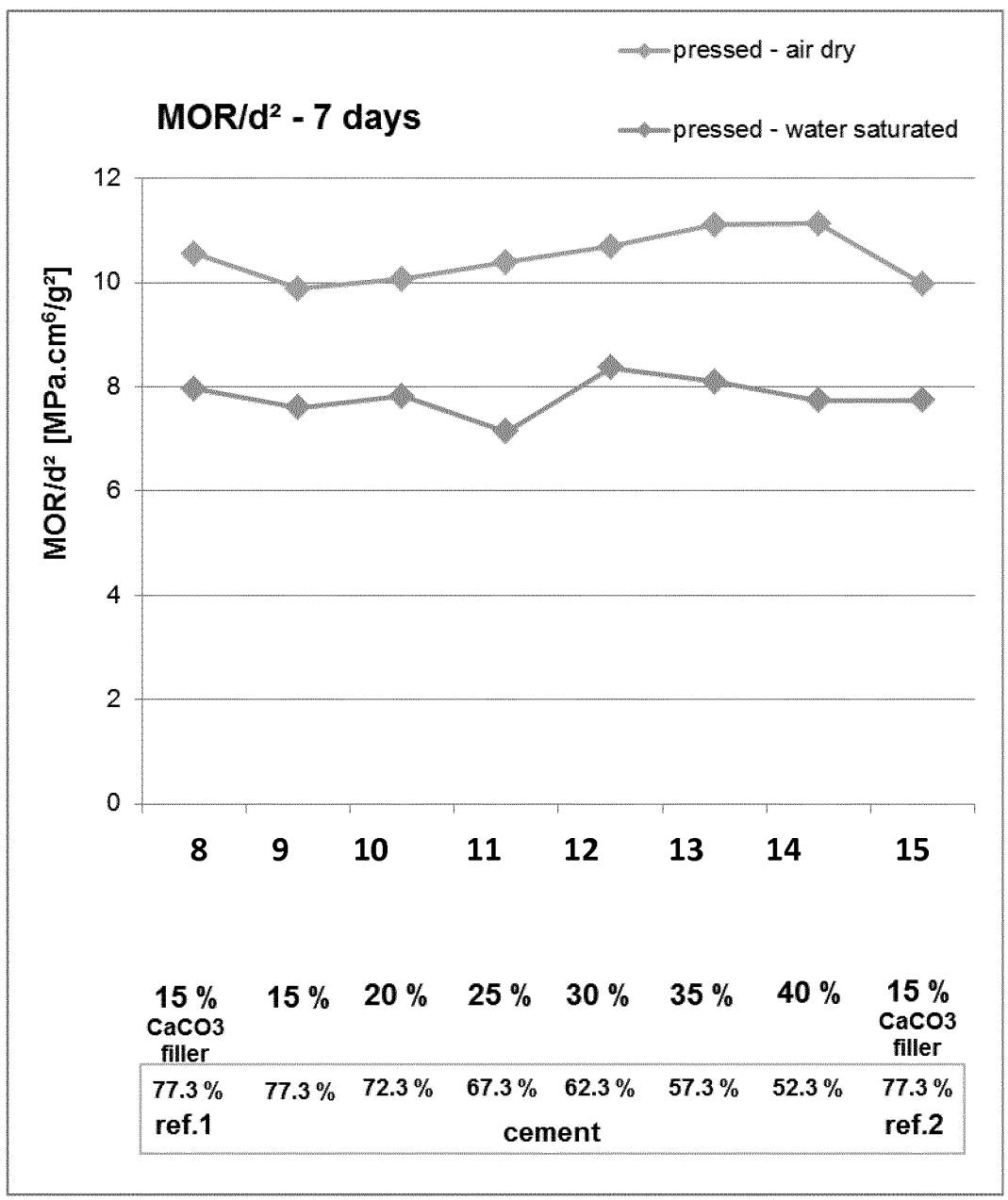
FIGS. 8 and 9 represent the density normalized flexural strength (modulus of rupture; MOR), as measured 7 and 28 days after production, of 6 different test samples (samples 9, 10, 11, 12, 13 and 14 of which the formulation is presented in Table 3) and two reference samples (samples 8 and 15 of which the formulation is presented in Table 3). The modulus of rupture (MOR; expressed in Pa=kg/m·s$^2$) was measured by making use of a UTS/INSTRON apparatus (type 3345; cel=5000N).
Figure 9:
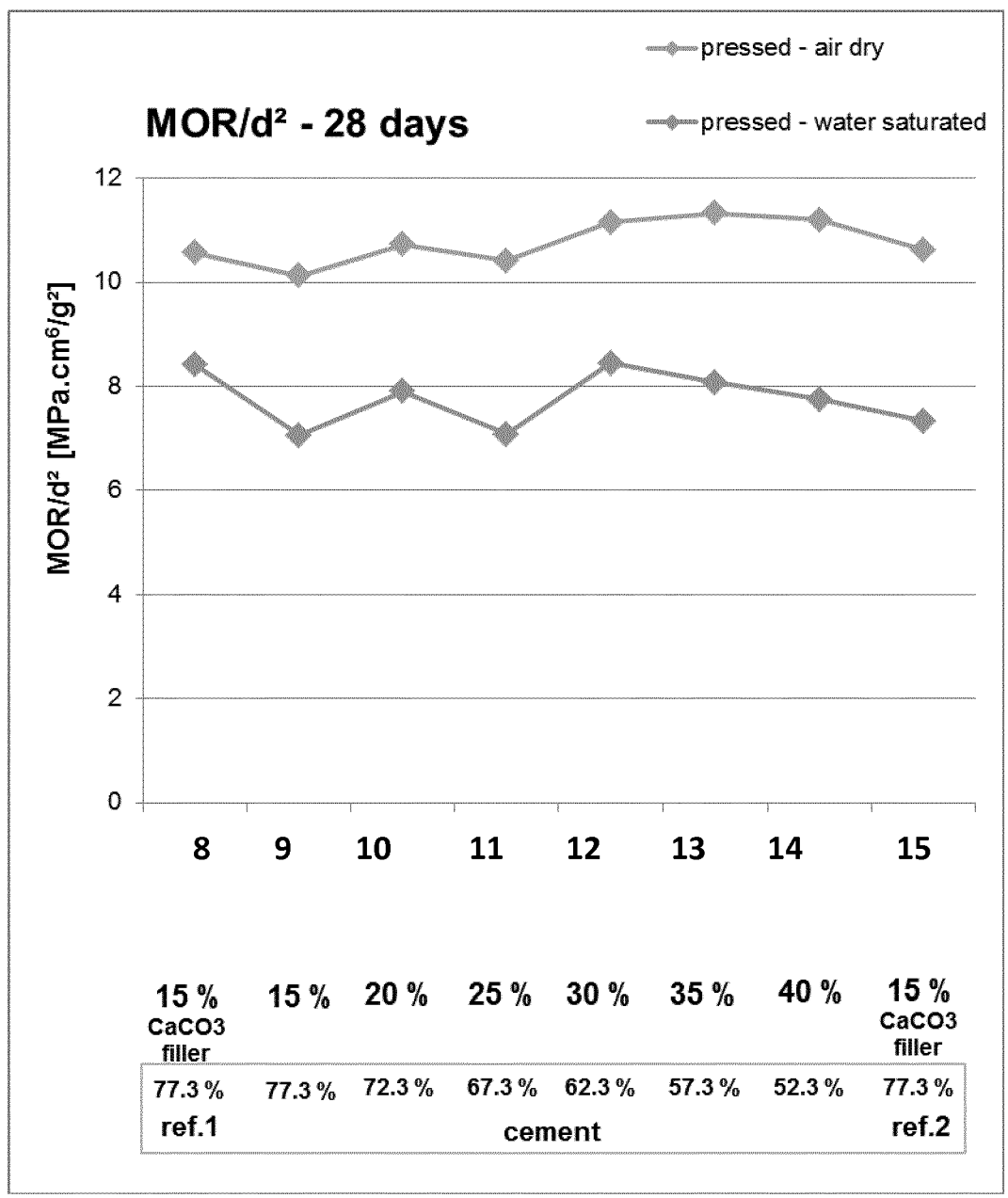

As can be derived from the graphs in FIGS. 8 and 9, which represent the density normalized flexural strength (modulus of rupture; MOR) of the 6 different test samples (9, 10, 11, 12, 13 and 14 of which the formulation is presented in Table 3) and the two reference samples (8 and 15 of which the formulation is presented in Table 3), it can be concluded that the density normalized flexural strength or modulus of rupture (MOR/$d^2$) is at least comparable and in some instances even higher in the test samples as compared to the reference samples. This means that the samples comprising the comminuted fiber cement waste powder in amounts of between 15M % and 40M % as produced according to the methods of the present invention have at least a comparable strength with reference samples not containing any waste powder.

Figure 10:
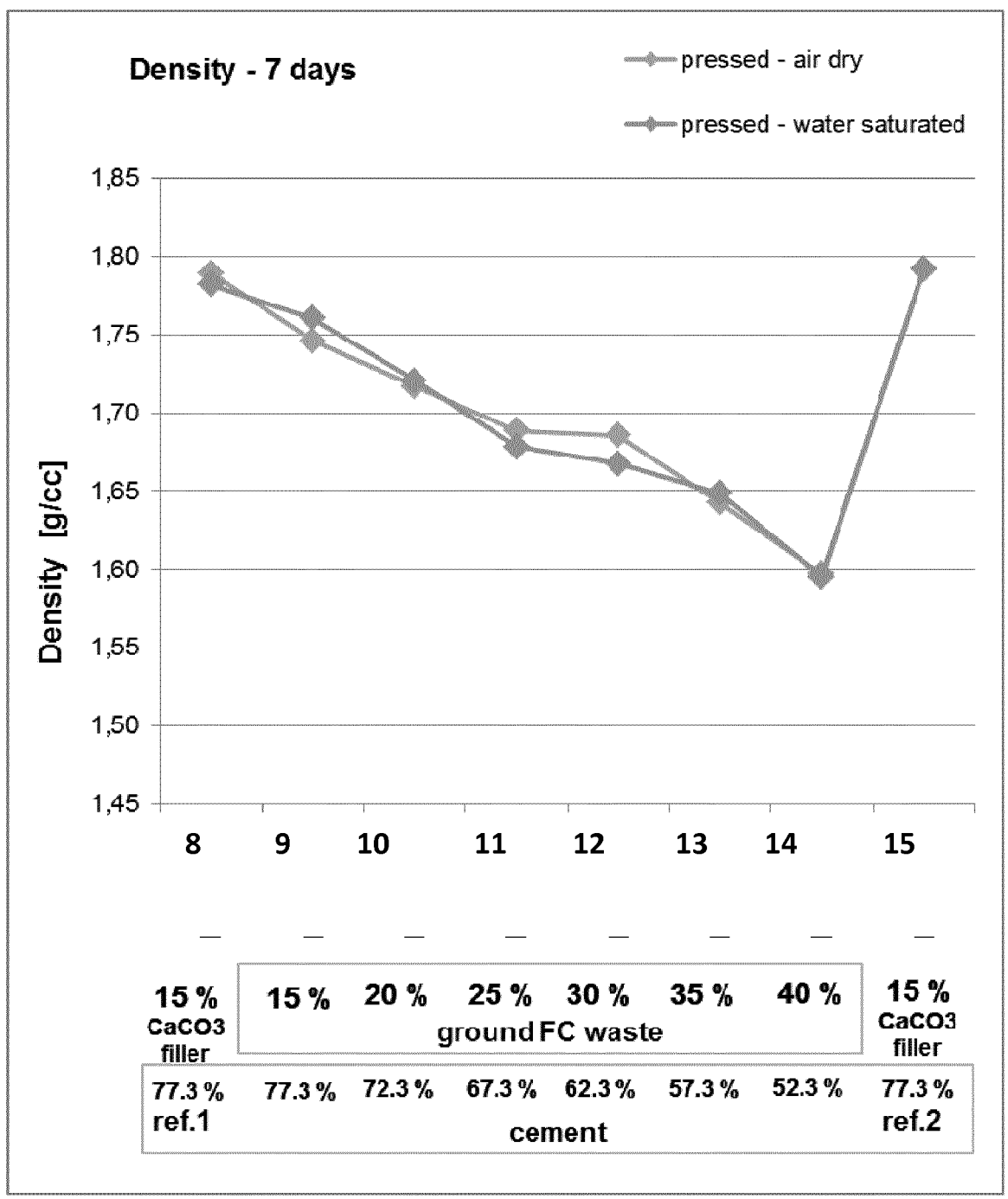
FIGS. 10 and 11 represent the density, as measured 7 and 28 days after production, of 6 different test samples (samples 9, 10, 11, 12, 13 and 14 of which the formulation is presented in Table 3) and two reference samples (samples 8 and 15 of which the formulation is presented in Table 3). The density was measured by saturating the samples during 72 hours in tap water. The weight of the samples was subsequently determined both under saturated and immersed conditions. Afterwards, the samples were placed to dry for 48 hours at about 105° C. For each of the dried samples, the weight was determined again. The density (X) for each sample was calculated by dividing the dry weight (C) by the difference between the immersed weight (B) and the saturated weight (A), according to the following formula: X=C/(A−B).
Figure 11:
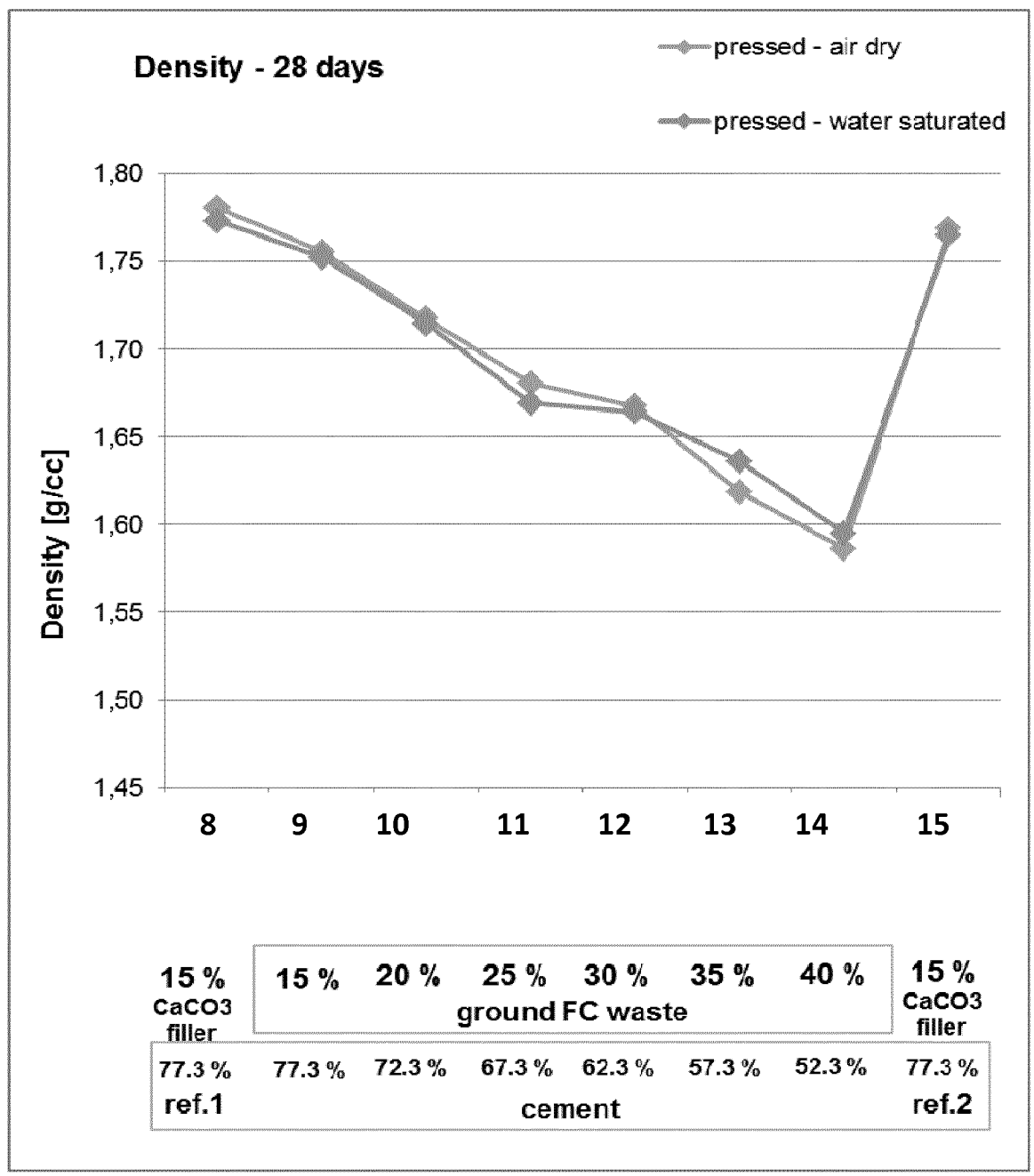

Moreover, as depicted in FIGS. 10 and 11, the density of the test samples 9 to 14, where part or all of the filler and/or part of the cement was replaced by the comminuted fiber cement powder of the invention, was significantly lower as compared to the reference samples not containing any waste powder. The density indeed gradually decreases when more comminuted fiber cement powder is added in replacement of filler and/or cement. This is a very important finding since a lower density is directly linked with a lower mass of the resulting products, which greatly facilitates the handling, workability and installation of the products for the end users.

Figure 12:
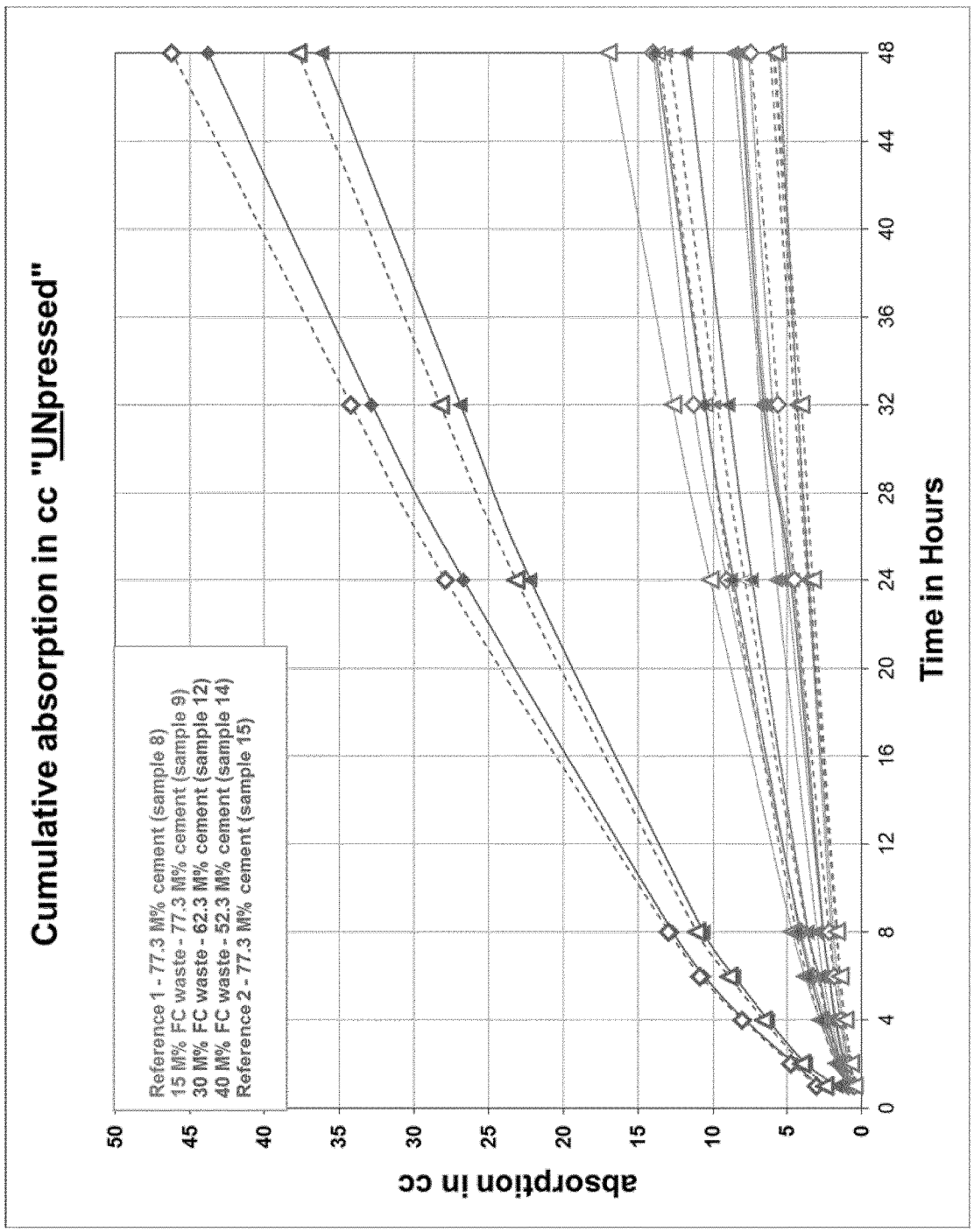
FIG. 12 shows the water absorption in function of time of 3 different test samples (samples 9, 12 and 14 of which the formulation is presented in Table 3) and two reference samples (samples 8 and 15 of which the formulation is presented in Table 3) as measured before pressing. The water absorption was measured using a Karsten test as further described herein.
Figure 13:
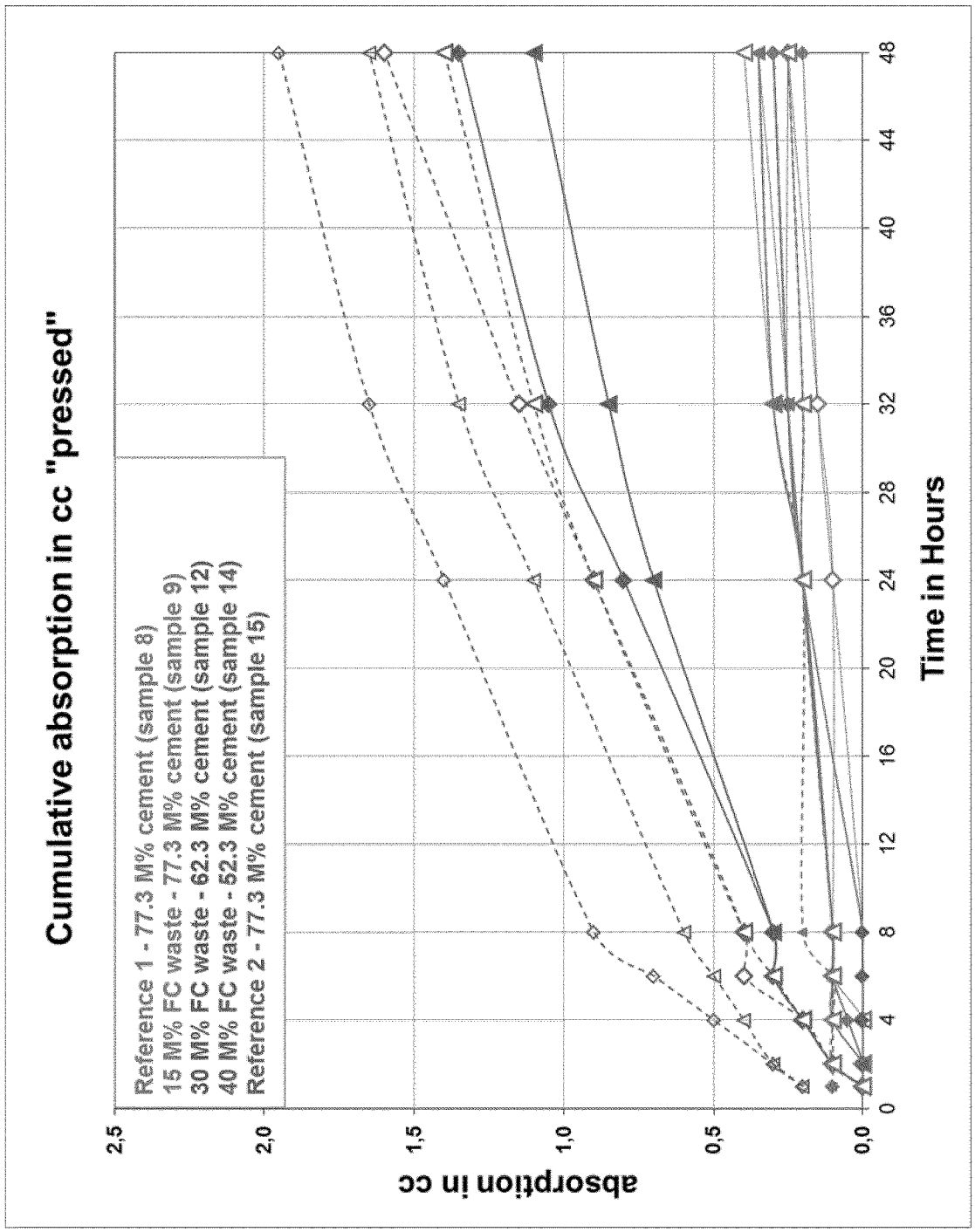
FIG. 13 shows the water absorption in function of time of 3 different test samples (samples 9, 12 and 14 of which the formulation is presented in Table 3) and two reference samples (samples 8 and 15 of which the formulation is presented in Table 3) as measured after pressing. The water absorption was measured using a Karsten test as further described herein.

Finally, based on the results from the Karsten tests as presented in FIGS. 12 and 13, it can be concluded that adding the air-cured fiber cement waste powder in amounts of 15M % in replacement of cement or filler material does not have an effect on the water absorption as compared to reference samples not containing any comminuted fiber cement waste powder. Adding the autoclave-cured fiber cement waste powder in higher amounts of for instance 30M % or 40 M % in replacement of cement or filler material results, however, in an increase in water absorption as compared to reference samples not containing any comminuted fiber cement waste powder. The results were observed both in the unpressed (FIG. 12) and pressed (FIG. 13) samples.

Thus, from the above, it can be concluded that fiber cement products comprising from 15M % to 40M % of air-cured comminuted fiber cement waste powder as produced by the methods of the present invention perform at least comparable and mostly even better than the reference fiber cement products not comprising any comminuted waste powder.

Example 4

Production of Autoclave-Cured Comminuted Fiber Cement Powder as Produced with a Pendular Mill According to the Methods of the Invention Autoclave-cured fiber cement products, obtainable as Cedral and Tectiva from Eternit NV Belgium, were first pre-crushed to such that the not more than 2 by 2 cm. The total humidity of the pre-crushed cured fiber cement waste material, in this case air cured fiber cement material, was about 5%-6% w based upon dry weight.

The % w based upon dry weight is the weight difference between the material as samples and the material dried in a ventilated furnace at 105° C. until constant weight is obtained.

This pre-crushed material was fed at a flow rate of about 350 kg/hr to about 800 kg/hr to a pendular mill type roller mill of the Poittemill Group (FR), in which the material was comminuted at a rotation speed of between about 100 and about 400 tr/min. To compensate the humidity of the pre-crushed material, hot air (at a temperature between about 20° C. and about 100° C.) was fed together with the pre-crushed material, in order to instantaneously suppress the humidity of the pre-crushed material and the ground fiber cement powder obtained.

As such the comminuted cured fiber cement material was obtained of which the particle size distribution curve, measured using laser beam diffraction on dry dispersed material at 3 bar by means of the apparatus Malvern mastersizer 2000, was obtained.

This fiber cement powder as obtained by pendular milling had a good consistency (not woolly or fluffy), a suitable bulk density (between about 1000 kg/$m^3$ and about 1300 kg/$m^3$) and a good particle distribution, to be used for the production of fresh fiber cement products. Without being bound to any hypothesis or theory, the present inventors believe that the pendular milling as used in the methods according to the present invention provides a novel and improved comminuted fiber cement waste powder because with this technique the fiber cement waste is squashed or flattened as opposed to other milling techniques, which typically mill by crushing or grinding.

Example 5

Production of Air-Cured Fiber Cement Slates Comprising from 5M % to 15M % of Autoclave-Cured Comminuted Fiber Cement Powder as Produced According to the Methods of the Invention The autoclave-cured fiber cement waste powders derived from Cedral products and Tectiva fiber cement products, obtained as described in Example 4, were used to produce fresh fiber cement slates, i.e. fresh fiber cement air cured products.

For the production of fiber cement slates, typically the following formulation of an aqueous fiber cement slurry is used:

73 to 80 M % Cement such as Portland cement
3 to 4 M % cellulose fibers (such as softwood unbleached Kraft pulp)
1.5 to 1.9 M % polyvinylalcohol fibers
10 to 18 M % of carbonaceous filler (typically limestone) and optionally a minor amount of other additives.

M % refers to the mass of the component over the total mass of all components except free water, i.e. the dry matter.

A series of 6 test slurry samples was produced (see Table 4 below: samples 17, 18, 20, 21, 22 and 23), wherein at least part or all of the carbonaceous filler, or at least part of the cement, or part of both the carbonaceous filler and the cement, was replaced by the comminuted autoclave-cured fiber cement powder as obtained using the comminuting method explained in Example 4. In addition, 2 reference slurry samples (see Table 4 below: samples 16 and 19) were produced, not containing any autoclave-cured comminuted waste powder.

As such, the following 8 fiber cement slurry formulations were obtained:

TABLE 4

FC formulations M % samples 16 to 23 (PVA: polyvinylalcohol fiber Kuraray A8; Cellulose: Solombala UKP 60° SR; Condensed silica fume: EMSAC 500S Elkem Materials Ltd.; $CaCO_3$ filler: Calcitec 2001S, Carmeuse SA; Cement: CEMI 42.5N, CBR SA, Lixhe)

|  | 16 | 17 | 18 | 19 | 20 | 21 | 22 | 23 |
|---|---|---|---|---|---|---|---|---|
| PVA | 1.8 | 1.8 | 1.8 | 1.8 | 1.8 | 1.8 | 1.8 | 1.8 |
| Cellulose | 3.3 | 3.3 | 3.3 | 3.3 | 3.3 | 3.3 | 3.3 | 3.3 |
| Condensed silica fume | 2.6 | 2.6 | 2.6 | 2.6 | 2.6 | 2.6 | 2.6 | 2.6 |
| $CaCO_3$ filler | 15.0 | 0.0 | 0.0 | 15.0 | 15.0 | 15.0 | 15.0 | 15.0 |
| Cement | 77.3 | 77.3 | 77.3 | 77.3 | 72.3 | 72.3 | 67.3 | 67.3 |
| FC waste Cedral | 0.0 | 15.0 | 0.0 | 0.0 | 5.0 | 0.0 | 10.0 | 0.0 |
| FC waste Tectiva | 0.0 | 0.0 | 15.0 | 0.0 | 0.0 | 5.0 | 0.0 | 10.0 |
| Total | 100.00 | 100.00 | 100.00 | 100.00 | 100.00 | 100.00 | 100.00 | 100.00 |

The fiber cement slurry formulations as presented in Table 4 were used to provide green sheets of fiber cement on a state of the art Hatschek production machine. Half of the green sheets were pressed at 230 kg/cm² and air-cured by subjecting them to a curing at 60° C. for 8 hours, and thereafter curing at ambient conditions. The other half of the green sheets was left unpressed and air-cured by subjecting them to a curing at 60° C. for 8 hours, and thereafter curing at ambient conditions.

The formed air-cured sheets were analyzed for their physico-mechanical characteristics characteristics, i.e. modulus of rupture (MOR). The modulus of rupture (MOR; expressed in Pa=kg/m·s²) was measured by making use of a UTS/INSTRON apparatus (type 3345; cel=5000N).

The density of the samples was measured by first saturating the samples during 72 hours in tap water. The weight of the samples was subsequently determined both under saturated and immersed conditions. Afterwards, the samples were placed to dry for 48 hours at about 105° C. For each of the dried samples, the weight was determined again. The density (X) for each sample was calculated by dividing the dry weight (C) by the difference between the immersed weight (B) and the saturated weight (A), according to the following formula: $X=C/(A-B)$.

Finally, the water absorption as measured by a Karsten test was determined. The test was performed both under air-dry and water-saturated conditions (air-dry condition is obtained by conditioning the samples in a ventilated oven at 40° C. during 3 days; water-saturated condition is obtained by immersion of the samples in tap water at room temperature and atmospheric pressure during 3 days).

For each of the air-dried and water-saturated samples, the thickness of the sample was determined. Subsequently, a Karsten tube was fixed on a central region of each sample using silicone. After 24 hours, the Karsten tube was filled with demineralized water and closed to prevent evaporation. Water absorption (i.e. the volume of water absorbed from the Karsten tube by the sample) was determined after 1, 2, 4, 6, 8, 24, 32 and 48 hours.

Figure 14:
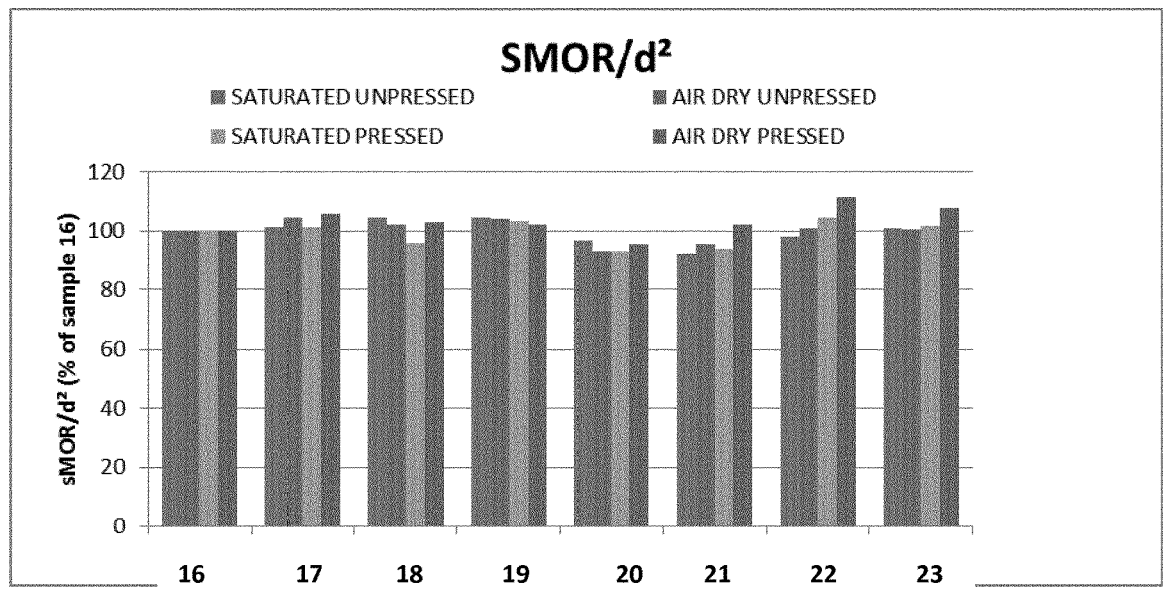
FIG. 14 represents the density normalized flexural strength (modulus of rupture; MOR; relative % of sample 16) of 6 different test samples (samples 17, 18, 20, 21, 22 and 23 of which the formulation is presented in Table 4) and two reference samples (samples 16 and 19 of which the formulation is presented in Table 4). The modulus of rupture (MOR; expressed in Pa=kg/m·s$^2$) was measured by making use of a UTS/INSTRON apparatus (type 3345; cel=5000N).

The results are presented in FIGS. 14 to 16.

As can be derived from the graph in FIG. 14, which represents the density normalized flexural strength (modulus of rupture; MOR) of the 6 different test samples (17, 18, 20, 21, 22 and 23 of which the formulation is presented in Table 4) and the two reference samples (16 and 19 of which the formulation is presented in Table 4), it can be observed that the density normalized flexural strength or modulus of rupture (MOR/d²) in the test samples is not significantly different to the MOR/d² of the reference samples. This means that the samples comprising the comminuted fiber cement waste powder in amounts of between 5M % and 15M % as produced according to the methods of the present invention have a comparable mechanical strength with regard to the reference samples not containing any waste powder.

Moreover, as depicted in FIG. 15, the density of the test samples 17, 18, 20, 21, 22 and 23, where part or all of the filler and/or part of the cement was replaced by the autoclave-cured comminuted fiber cement powder of the invention, was significantly lower as compared to the reference samples not containing any waste powder. The density indeed gradually decreases when more comminuted fiber cement powder is added in replacement of filler and/or cement. This is a very important finding since a lower density is directly linked with a lower mass of the resulting products, which greatly facilitates the handling, workability and installation of the products for the end users.

Finally, based on the results from the Karsten tests as presented in FIG. 16, it can be concluded that adding the autoclave-cured fiber cement waste powder in amounts from 5M % to 10M % in replacement of cement or filler material does not have a significantly relevant effect on the water absorption as compared to reference samples not containing any comminuted fiber cement waste powder.

Thus, from the above, it can be concluded that fiber cement products comprising from 5M % to 15M % of autoclave-cured comminuted fiber cement waste powder as produced by the methods of the present invention perform significantly better than the reference fiber cement products not comprising any comminuted waste powder. Indeed, the mechanical strength and water absorption of air-cured fiber cement products containing comminuted waste powder does not change in comparison with air-cured fiber cement products not comprising waste, while the density significantly decreases in the products containing waste vs. those not containing waste.

Example 6

Production of Air-Cured Fiber Cement Slates Comprising from 20M % to 40M % of Autoclave-Cured Comminuted Fiber Cement Powder as Produced According to the Methods of the Invention The autoclave-cured fiber cement waste powders derived from Cedral products and Tectiva fiber cement products, obtained as described in Example 4, were used to produce fresh fiber cement slates, i.e. fresh fiber cement air cured products.

For the production of fiber cement slates, typically the following formulation of an aqueous fiber cement slurry is used:
- 73 to 80 M % Cement such as Portland cement
- 3 to 4 M % cellulose fibers (such as softwood unbleached Kraft pulp)
- 1.5 to 1.9 M % polyvinylalcohol fibers
- 10 to 18 M % of carbonaceous filler (typically limestone)
- and optionally a minor amount of other additives.

M % refers to the mass of the component over the total mass of all components except free water, i.e. the dry matter.

A series of 6 test slurry samples was produced (see Table 5 below: samples 25 to 30), wherein at least part or all of the carbonaceous filler, or at least part of the cement, or part of both the carbonaceous filler and the cement, was replaced by the comminuted autoclave-cured fiber cement powder as obtained using the comminuting method explained in Example 4. In addition, 2 reference slurry samples (see Table 5 below: samples 24 and 31) were produced, not containing any autoclave-cured comminuted waste powder.

As such, the following 8 fiber cement slurry formulations were obtained:

Finally, the water absorption as measured by a Karsten test was determined. The test was performed both under air-dry and water-saturated conditions (air-dry condition is obtained by conditioning the samples in a ventilated oven at 40° C. during 3 days; water-saturated condition is obtained by immersion of the samples in tap water at room temperature and atmospheric pressure during 3 days).

For each of the air-dried and water-saturated samples, the thickness of the sample was determined. Subsequently, a Karsten tube was fixed on a central region of each sample using silicone. After 24 hours, the Karsten tube was filled with demineralized water and closed to prevent evaporation. Water absorption (i.e. the volume of water absorped from the Karsten tube by the sample) was determined after 1, 2, 4, 6, 8, 24, 32 and 48 hours.

The results are presented in FIGS. 17 to 20.

As can be derived from the graph in FIG. 17, which represents the density normalized flexural strength (modulus of rupture; MOR) of the 6 different test samples (17 to 22 of which the formulation is presented in Table 5) and the two reference samples (16 and 23 of which the formulation is presented in Table 5), it can be concluded that the density normalized flexural strength or modulus of rupture (MOR/$d^2$) is higher in the test samples as compared to the reference samples, especially when the samples are pressed. This

TABLE 5

FC formulations M % samples 24 to 31 (PVA: polyvinylalcohol fiber Kuraray A8; Cellulose: Solombala UKP 60° SR; Condensed silica fume: EMSAC 500S Elkem Materials Ltd.; CaCO$_3$ filler: Calcitec 2001S, Carmeuse SA; Cement: CEMI 42.5N, CBR SA, Lixhe)

|  | 24 | 25 | 26 | 27 | 28 | 29 | 30 | 31 |
|---|---|---|---|---|---|---|---|---|
| PVA | 1.8 | 1.8 | 1.8 | 1.8 | 1.8 | 1.8 | 1.8 | 1.8 |
| Cellulose | 3.3 | 3.3 | 3.3 | 3.3 | 3.3 | 3.3 | 3.3 | 3.3 |
| Condensed silica fume | 2.6 | 2.6 | 2.6 | 2.6 | 2.6 | 2.6 | 2.6 | 2.6 |
| CaCO$_3$ filler | 15.0 | 0.0 | 0.0 | 0.0 | 0.0 | 0.0 | 0.0 | 15.0 |
| Cement | 77.3 | 72.3 | 62.3 | 52.3 | 72.3 | 62.3 | 52.3 | 77.3 |
| FC waste Cedral | 0.0 | 20.0 | 30.0 | 40.0 | 0.0 | 0.0 | 0.0 | 0.0 |
| FC waste Tectiva | 0.0 | 0.0 | 0.0 | 0.0 | 20.0 | 30.0 | 40.0 | 0.0 |
| Total | 100.00 | 100.00 | 100.00 | 100.00 | 100.00 | 100.00 | 100.00 | 100.00 |

The fiber cement slurry formulations as presented in Table 5 were used to provide green sheets of fiber cement on a state of the art Hatschek production machine. Half of the green sheets were pressed at 230 kg/cm$^2$ and air-cured by subjecting them to a curing at 60° C. for 8 hours, and thereafter curing at ambient conditions. The other half of the green sheets was left unpressed and air-cured by subjecting them to a curing at 60° C. for 8 hours, and thereafter curing at ambient conditions.

The formed air-cured sheets were analyzed for their physico-mechanical characteristics, i.e. modulus of rupture (MOR). The modulus of rupture (MOR; expressed in Pa=kg/m·s$^2$) was measured by making use of a UTS/INSTRON apparatus (type 3345; cel=5000N).

The density of the samples was measured by first saturating the samples during 72 hours in tap water. The weight of the samples was subsequently determined both under saturated and immersed conditions. Afterwards, the samples were placed to dry for 48 hours at about 105° C. For each of the dried samples, the weight was determined again. The density (X) for each sample was calculated by dividing the dry weight (C) by the difference between the immersed weight (B) and the saturated weight (A), according to the following formula: X=C/(A−B).

means that the samples comprising the comminuted fiber cement waste powder in amounts of between 20M % and 40M % as produced according to the methods of the present invention have a higher strength with reference samples not containing any waste powder. The best results were obtained when the samples are pressed.

Moreover, as depicted in FIG. 18, the density of the test samples 17 to 22, where part or all of the filler and/or part of the cement was replaced by the autoclave-cured comminuted fiber cement powder of the invention, was significantly lower as compared to the reference samples 16 and 23, which do not contain any waste powder. The density indeed gradually decreases when more comminuted fiber cement powder is added in replacement of filler and/or cement. This effect was observed in both pressed and unpressed samples when respectively compared to the corresponding pressed and unpressed reference samples. This is a very important finding since a lower density is directly linked with a lower mass of the resulting products, which greatly facilitates the handling, workability and installation of the products for the end users.

Finally, based on the results from the Karsten tests as presented in FIGS. 19 and 20, it can be concluded that adding the autoclave-cured fiber cement waste powder in amounts of 20M % in replacement of cement or filler material does not have an effect on the water absorption as compared to reference samples not containing any comminuted fiber cement waste powder. The best results are obtained when the samples are pressed.

Adding the autoclave-cured fiber cement waste powder in higher amounts of for instance 30M % or 40 M % in replacement of cement or filler material results however in an increase in water absorption as compared to reference samples not containing any comminuted fiber cement waste powder.

Thus, from the above, it can be concluded that fiber cement products comprising from 15M % to 40M % of comminuted fiber cement waste powder as produced by the methods of the present invention comprising the step of pressing before the curing step, perform comparable to fiber cement products not comprising any comminuted waste powder and perform significantly better than unpressed fiber cement products containing the same amounts of comminuted waste.

From the pictures of the air-cured products manufactured as described in the present examples, it can be seen that these products contain autoclave-cured fiber cement waste. Indeed, only autoclave-cured material typically contains white quartz particles, which quartz particles are also present in the recycled air-cured products produced according to the methods of the invention (see FIG. 20) but which are not present in fresh air-cured products (see FIG. 21).

It is to be understood that although preferred embodiments and/or materials have been discussed for providing embodiments according to the present invention, various modifications or changes may be made without departing from the scope and spirit of this invention.

The invention claimed is:

1. A method for the production of air-cured fiber cement products, comprising the steps of:
    (a) Providing cured fiber cement powder by comminuting cured fiber cement material;
    (b) Providing an aqueous fiber cement slurry comprising water, cementitious binder, natural or synthetic fibers and between about 5M% and about 35M% of said cured fiber cement powder;
    (c) Forming the slurry (b) into a green fiber cement sheet;
    (d) Pressing said green fiber cement sheet with a pressure of between about 180 kg/cm$^2$ and about 250 kg/cm$^2$; and
    (e) Air-curing said green fiber cement sheet, thereby providing an air-cured fiber cement product.

2. A method for the production of air-cured fiber cement products, comprising the steps of:
    (a) Providing cured fiber cement powder by comminuting cured fiber cement material;
    (b) Providing an aqueous fiber cement slurry comprising mixing water, cementitious binder, natural or synthetic fibers and the cured fiber cement powder, such that the cured fiber cement powder is present in the aqueous fiber cement slurry in an amount of between about 5M% and about 40 M% of the dry basis of said slurry;
    (c) Forming the slurry (b) into a green fiber cement sheet;
    (d) Pressing said green fiber cement sheet with a pressure of between about 100 kg/cm$^2$ and about 300 kg/cm$^2$; and
    (e) Air-curing said green fiber cement sheet, thereby providing an air-cured fiber cement product.

3. The method according to claim 1, wherein said step (b) of providing an aqueous fiber cement slurry comprises mixing water, cementitious binder, natural or synthetic fibers and the cured fiber cement powder, such that the cured fiber cement powder is present in the aqueous fiber cement slurry in an amount of between about 5M% and about 15M% of the dry basis of said slurry.

4. The method according to claim 1, wherein said pressing of said green fiber cement sheet comprises compressing said green fiber cement sheet during a time period of between about 5 minutes and about 15 minutes.

5. The method according to claim 1, wherein said pressing of said green fiber cement sheet comprises compressing said green fiber cement sheet by at least one or more mechanical presses.

6. The method according to claim 1, wherein said pressing of said green fiber cement sheet comprises compressing said green fiber cement sheet by at least one or more stack presses.

7. The method according to claim 1, wherein said step (a) of providing cured fiber cement powder comprises comminuting an air-cured fiber cement product.

8. The method according to claim 1, wherein said step (a) of providing cured fiber cement powder comprises comminuting an autoclave-cured fiber cement product.

9. The method according to claim 1, wherein said step (a) of providing cured fiber cement powder comprises comminuting a cured fiber cement product with a pendulum mill.

10. The method according to claim 2, wherein said step (b) of providing an aqueous fiber cement slurry comprises mixing water, cementitious binder, natural or synthetic fibers and the cured fiber cement powder, such that the cured fiber cement powder is present in the aqueous fiber cement slurry in an amount of between about 5M% and about 15M% of the dry basis of said slurry.

11. The method according to claim 2, wherein said pressing of said green fiber cement sheet comprises compressing said green fiber cement sheet during a time period of between about 5 minutes and about 15 minutes.

12. The method according to claim 2, wherein said pressing of said green fiber cement sheet comprises compressing said green fiber cement sheet by at least one or more mechanical presses.

13. The method according to claim 2, wherein said pressing of said green fiber cement sheet comprises compressing said green fiber cement sheet by at least one or more stack presses.

14. The method according to claim 2, wherein said step (a) of providing cured fiber cement powder comprises comminuting an air-cured fiber cement product.

15. The method according to claim 2, wherein said step (a) of providing cured fiber cement powder comprises comminuting an autoclave-cured fiber cement product.

16. The method according to claim 2, wherein said step (a) of providing cured fiber cement powder comprises comminuting a cured fiber cement product with a pendulum mill.

* * * * *